US011935134B2

(12) United States Patent
Clark et al.

(10) Patent No.: US 11,935,134 B2
(45) Date of Patent: Mar. 19, 2024

(54) METHODS AND SYSTEMS FOR ADMINISTERING INSURANCE PRODUCTS WITH DEATH BENEFITS AUTOMATICALLY ADJUSTED WITHOUT UNDERWRITING BASED ON INDEPENDENT DATA CORRELATED WITH AN INSURED INDIVIDUALS NEED FOR LIFE INSURANCE BENEFITS

(71) Applicant: AmerUs Group Inc., Clive, IA (US)

(72) Inventors: Brian James Clark, Clive, IA (US); Charles Dodd Starbird, Alpharetta, GA (US)

( * ) Notice: Subject to any disclaimer, the term of this patent is extended or adjusted under 35 U.S.C. 154(b) by 0 days.

(21) Appl. No.: 18/233,239

(22) Filed: Aug. 11, 2023

(65) Prior Publication Data
US 2023/0385942 A1 Nov. 30, 2023

Related U.S. Application Data

(63) Continuation-in-part of application No. 17/853,038, filed on Jun. 29, 2022.

(60) Provisional application No. 63/312,549, filed on Feb. 22, 2022, provisional application No. 63/257,353, filed on Oct. 19, 2021, provisional application No. 63/257,377, filed on Oct. 19, 2021, provisional application No. 63/257,365, filed on Oct. 19, 2021, provisional application No. 63/257,325, filed on Oct. 19, 2021, provisional application No. 63/216,835, filed on Jun. 30, 2021.

(51) Int. Cl.
*G06Q 40/08* (2012.01)

(52) U.S. Cl.
CPC ................................ *G06Q 40/08* (2013.01)

(58) Field of Classification Search
CPC ...................................................... G06Q 40/08
See application file for complete search history.

(56) References Cited

U.S. PATENT DOCUMENTS

| 10,282,785 | B1 * | 5/2019 | Yager | G06Q 30/02 |
| 2008/0183636 | A1 * | 7/2008 | Walsh | G06Q 40/06 |
| | | | | 705/36 R |
| 2016/0125545 | A1 * | 5/2016 | Behrens | G06Q 40/08 |
| | | | | 705/4 |

* cited by examiner

*Primary Examiner* — Scott S Trotter
*Assistant Examiner* — William D Newlon
(74) *Attorney, Agent, or Firm* — Bryan Cave Leighton Paisner LLP

(57) ABSTRACT

Consumer needs for life insurance benefits change over time, yet traditional individual insurance policies have a fixed death benefit. Embodiments disclosed herein are directed to a user interface that facilitates forecasting future benefits and premiums under user-defined assumptions to optimize the policy application process and coverage, and to system and method for administering life insurance policies with death benefits that are automatically, periodically adjusted, without requiring new underwriting, based on third-party data linked to the insured's specific life insurance need. Embodiments disclosed herein facilitate the alignment of life insurance benefits with an individual's need as those needs change over time regardless of their changing health status, ensuring coverage when the need increases while saving money on unnecessary premiums when the need is declining.

12 Claims, 22 Drawing Sheets

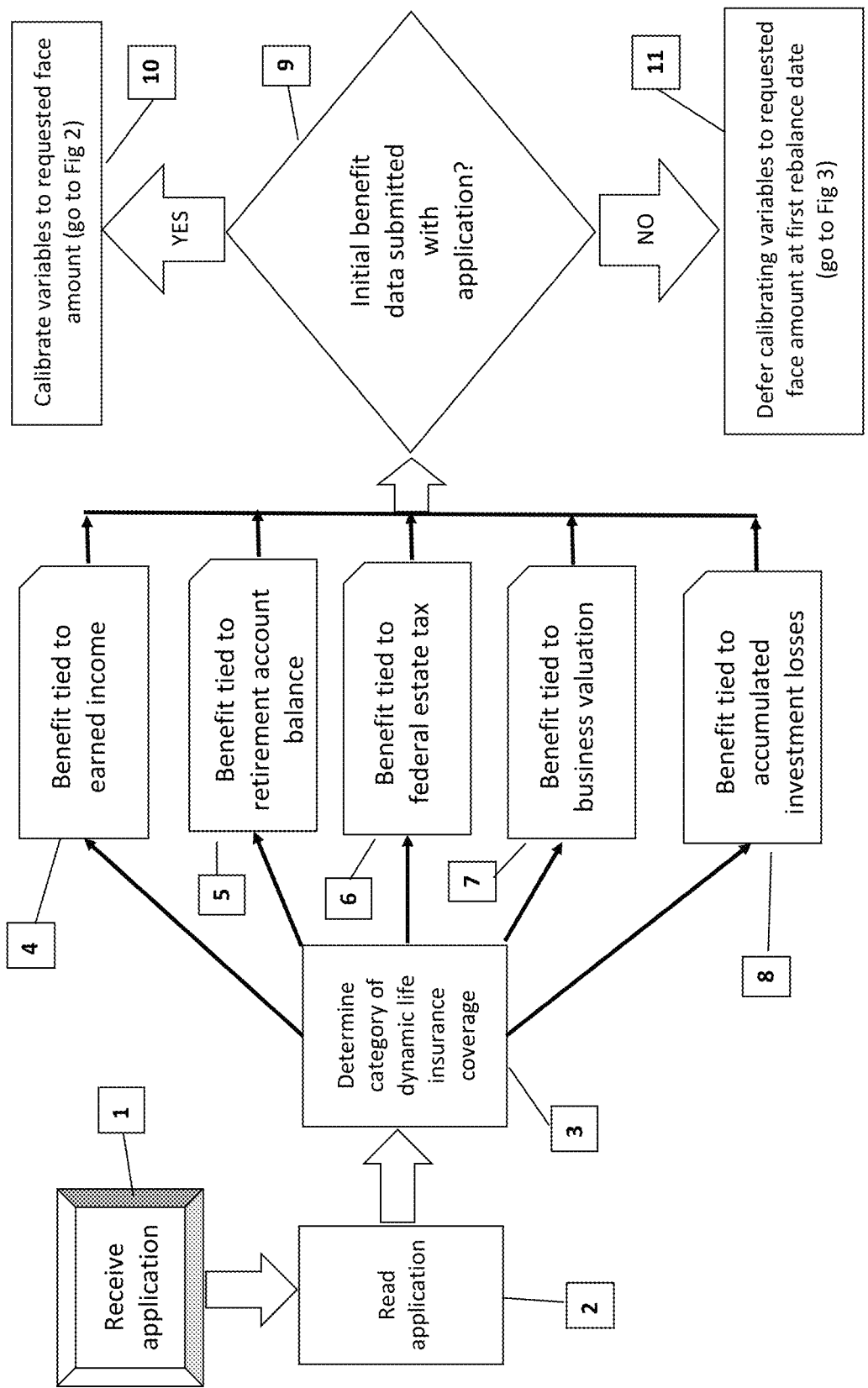

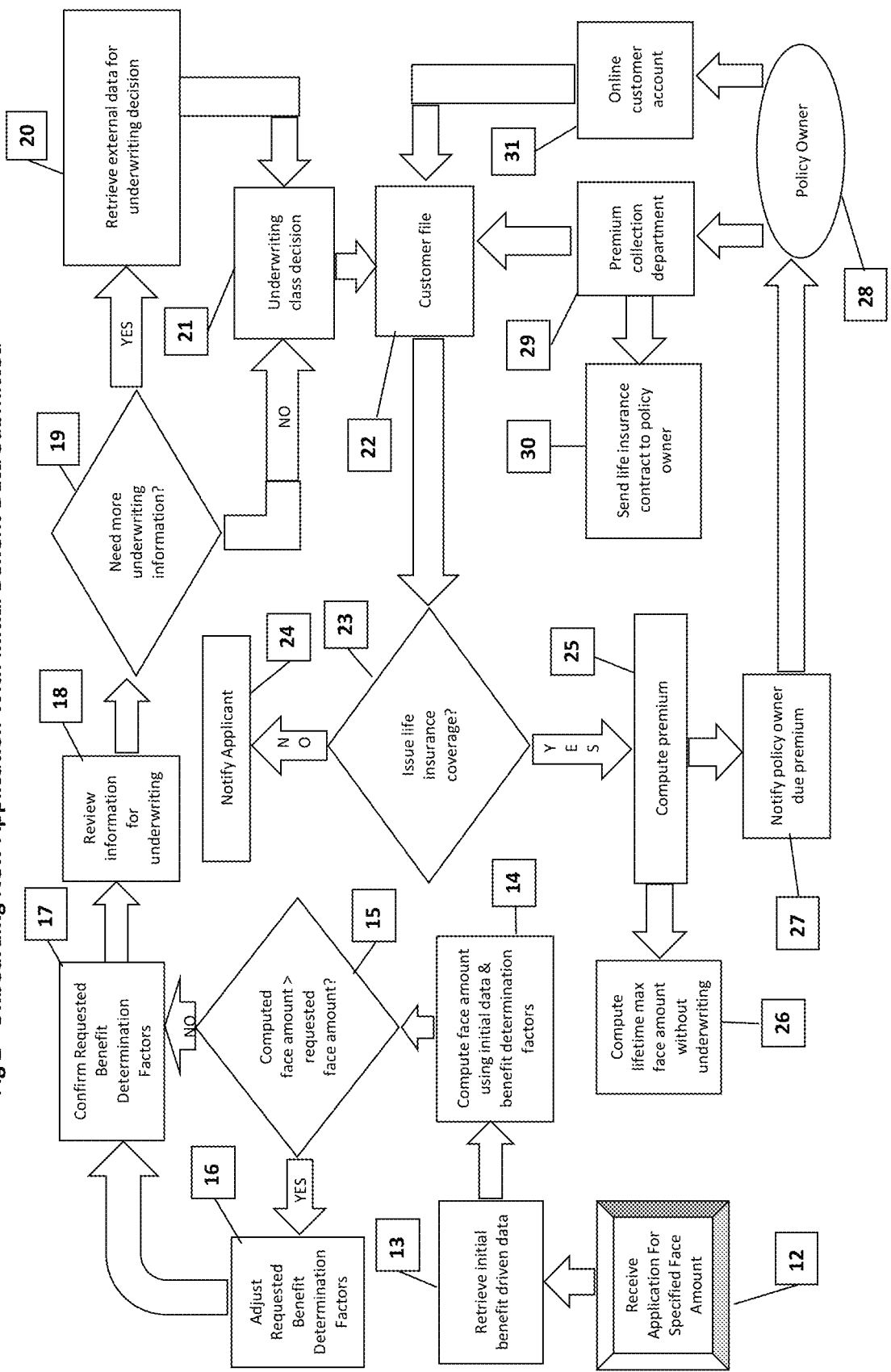
Fig 2 - Onboarding New Application With Initial Benefit Data Submitted

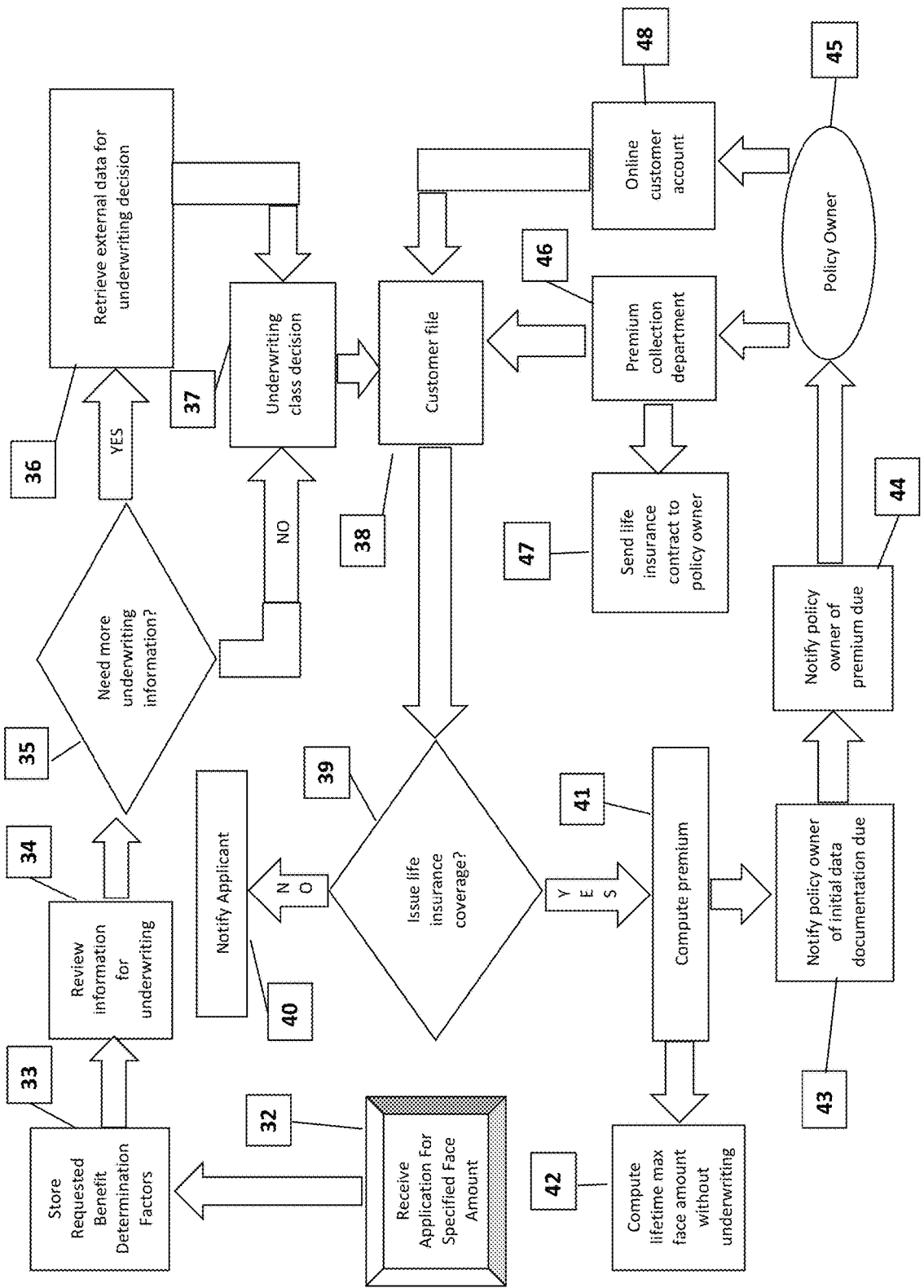
Fig 3 - Onboarding New Application Without Initial Benefit Data Submitted

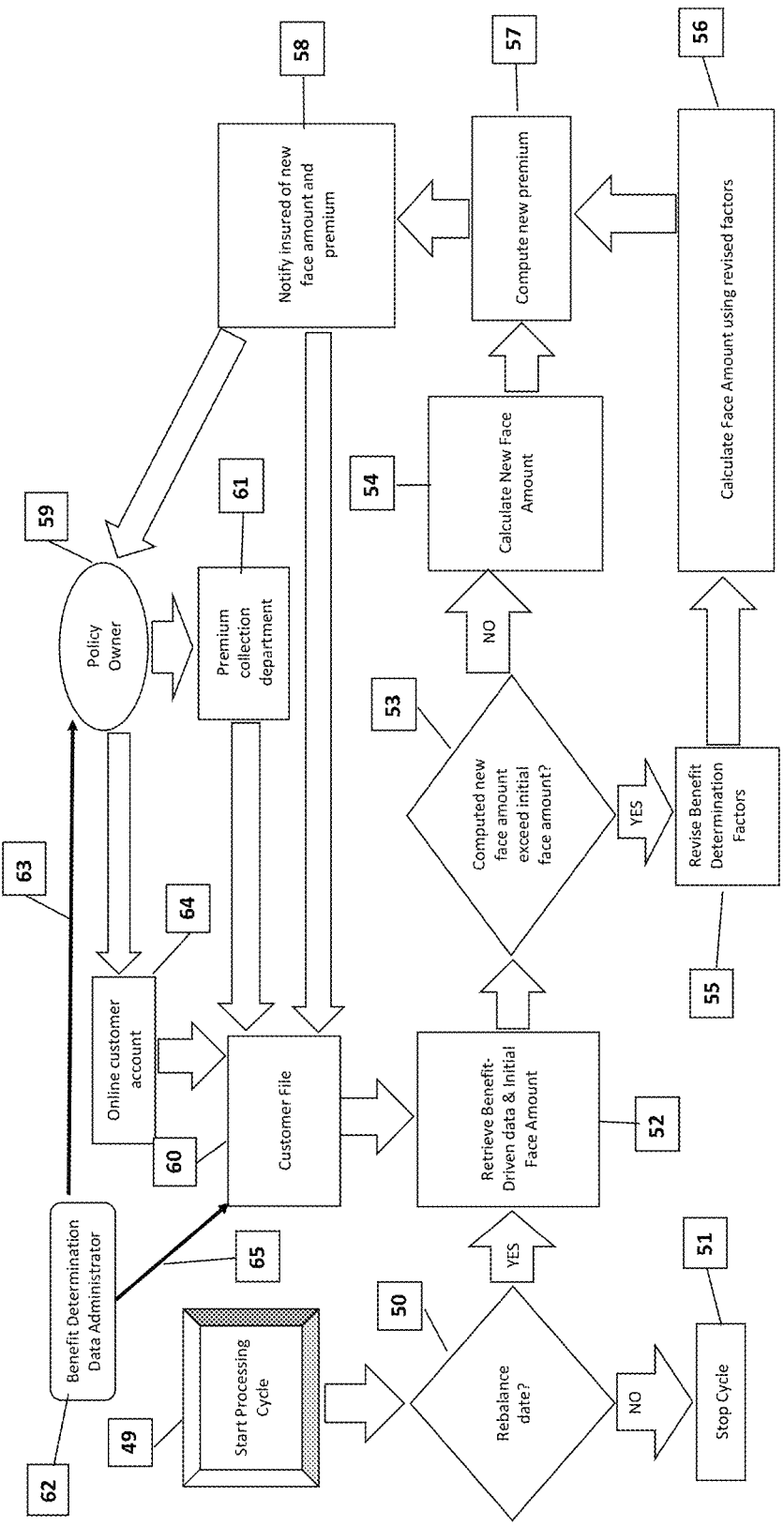
Fig 4 - First Rebalance Cycle When Initial Benefit Data Not Received With Application

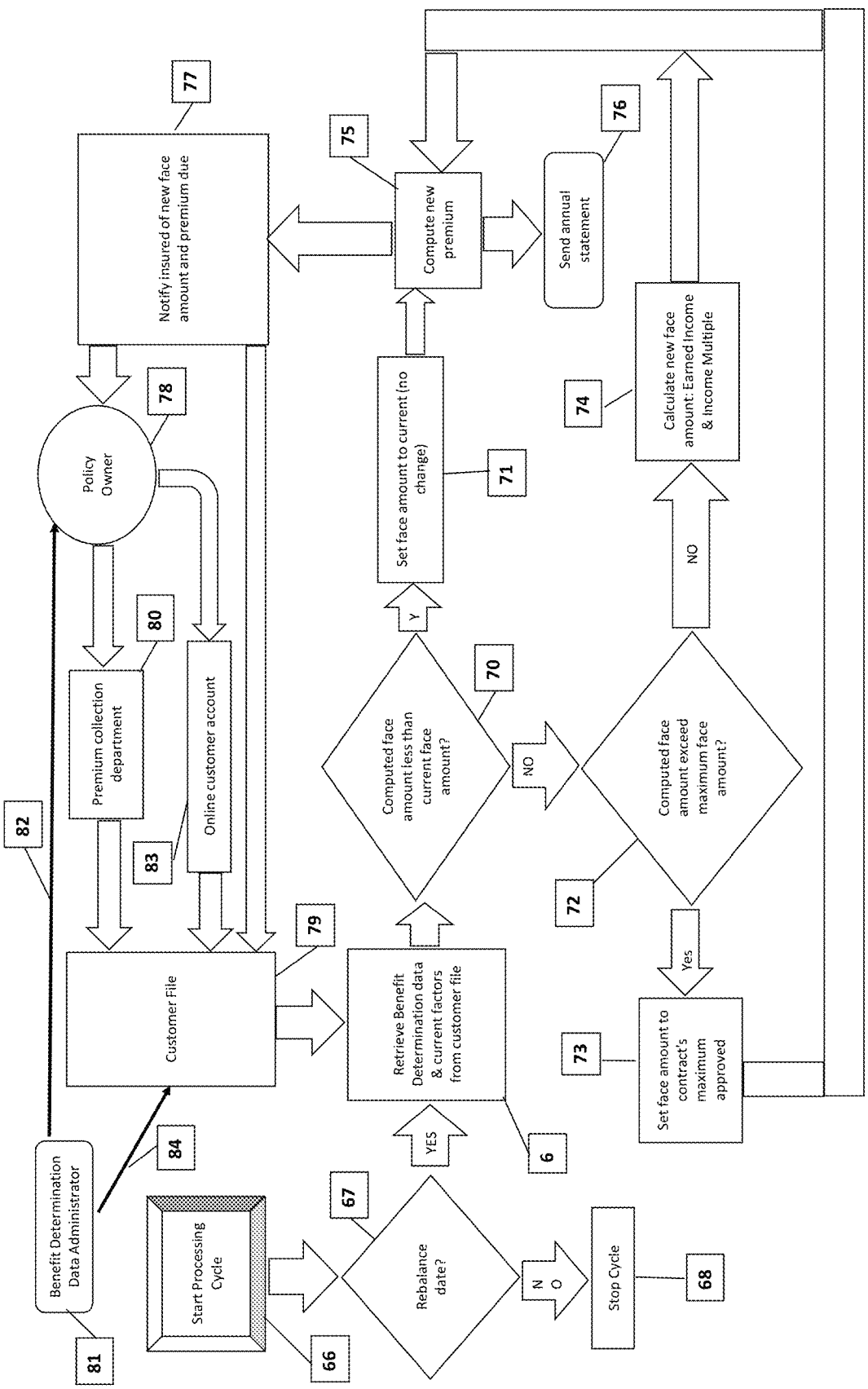
Fig 5A - Ongoing Rebalance Cycle: Income Protector

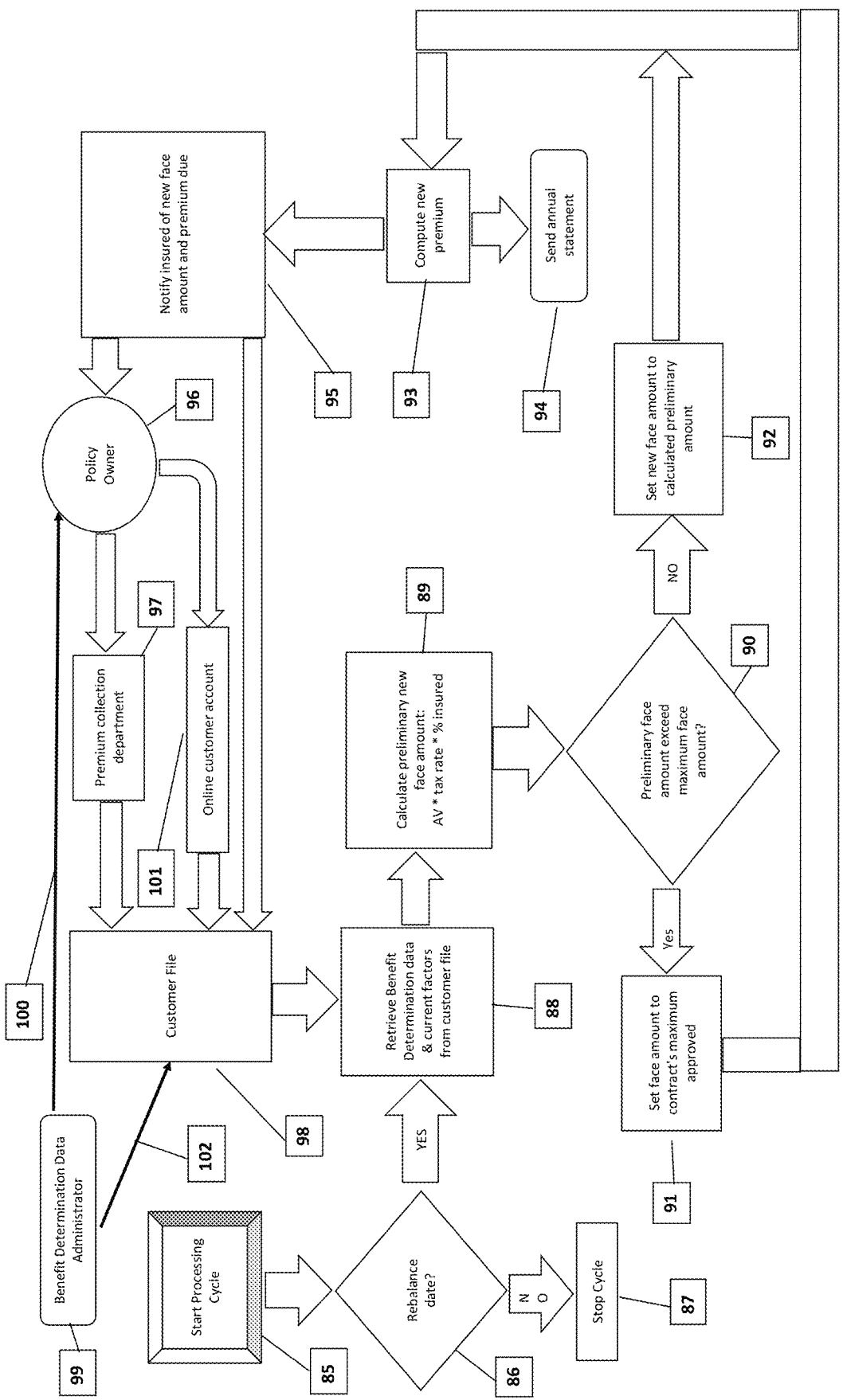
Fig 5B - Ongoing Rebalance Cycle: Retirement Account Income Tax Example

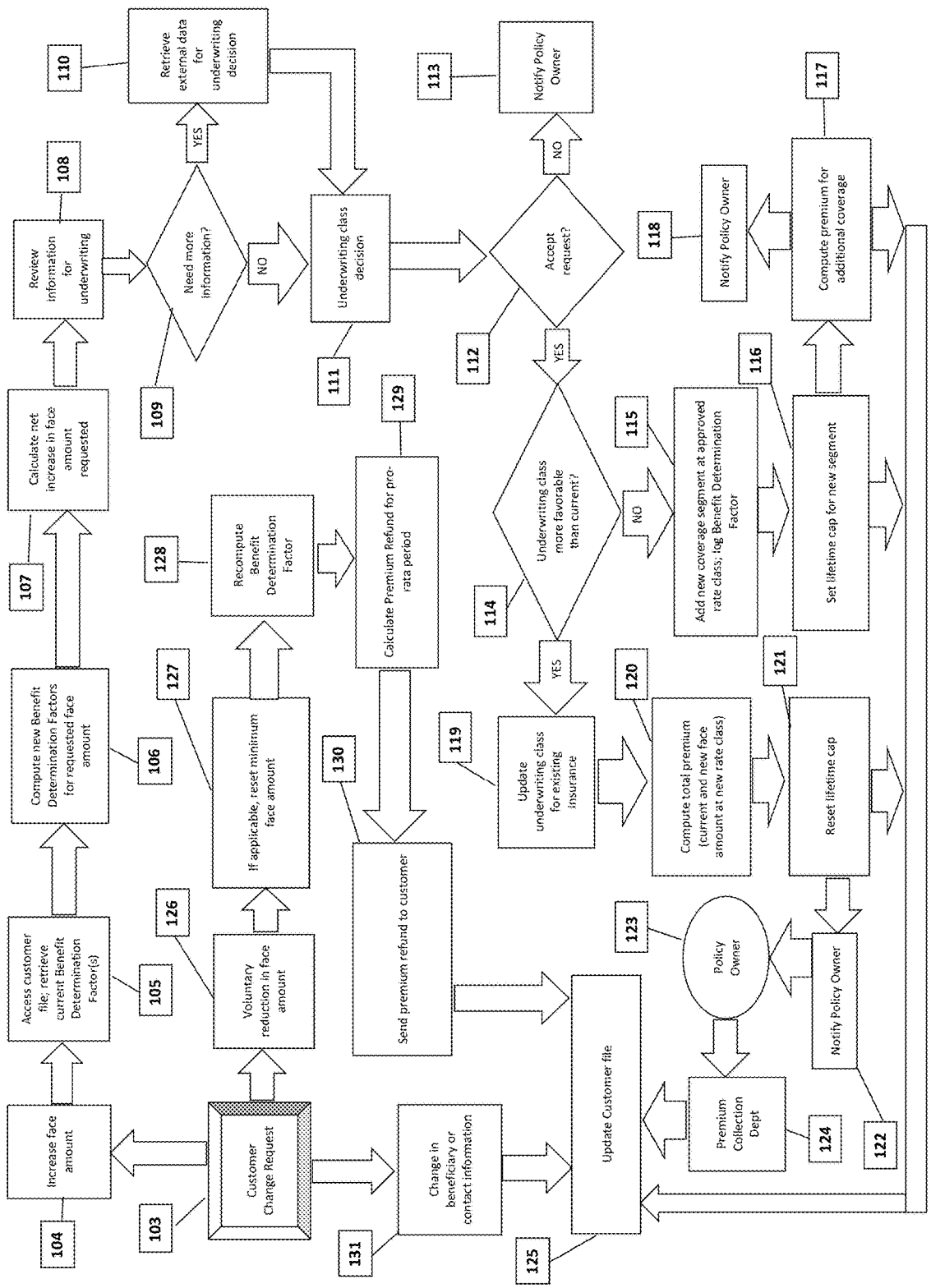

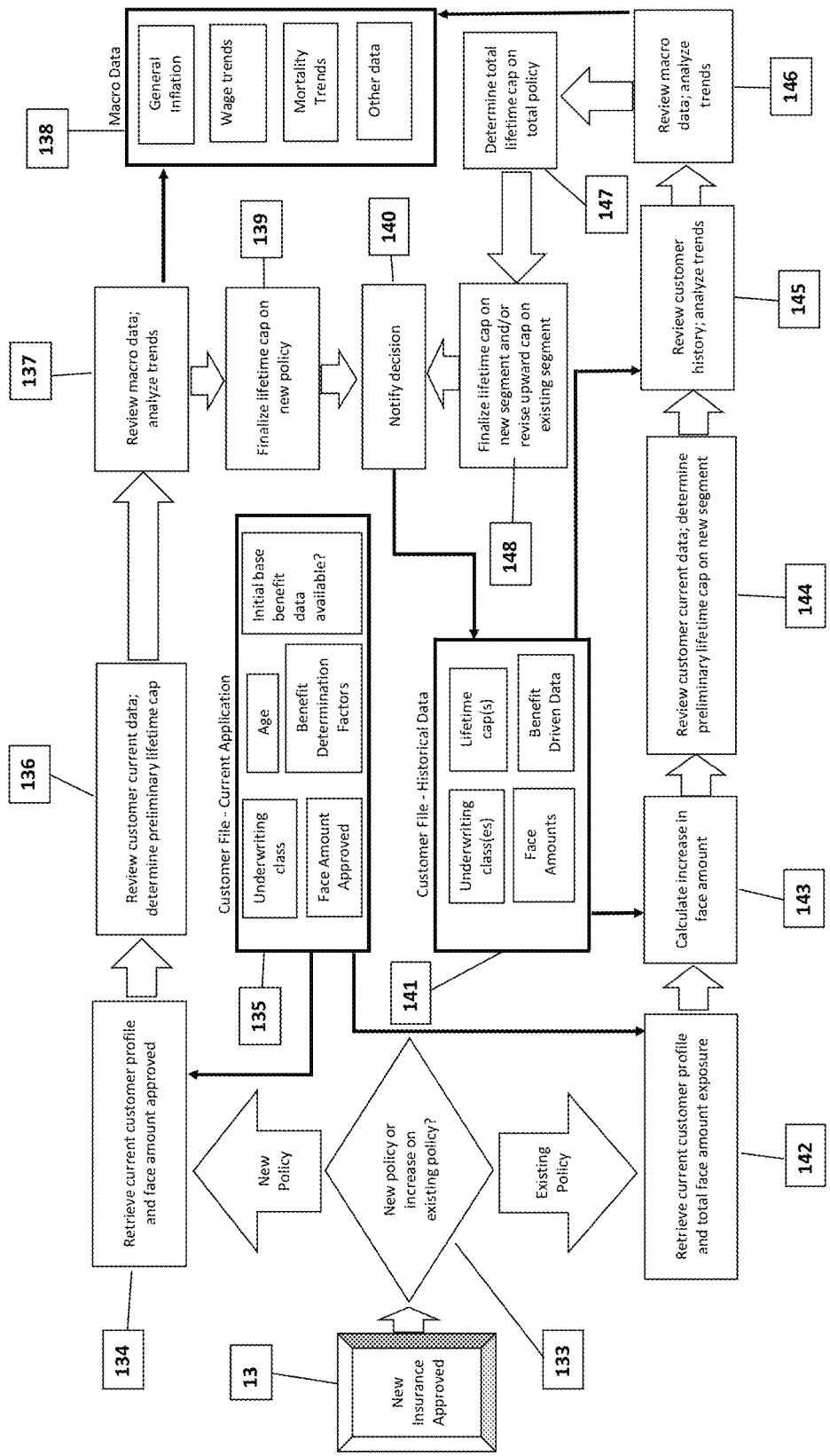
Fig 7 - Lifetime Cap Determination

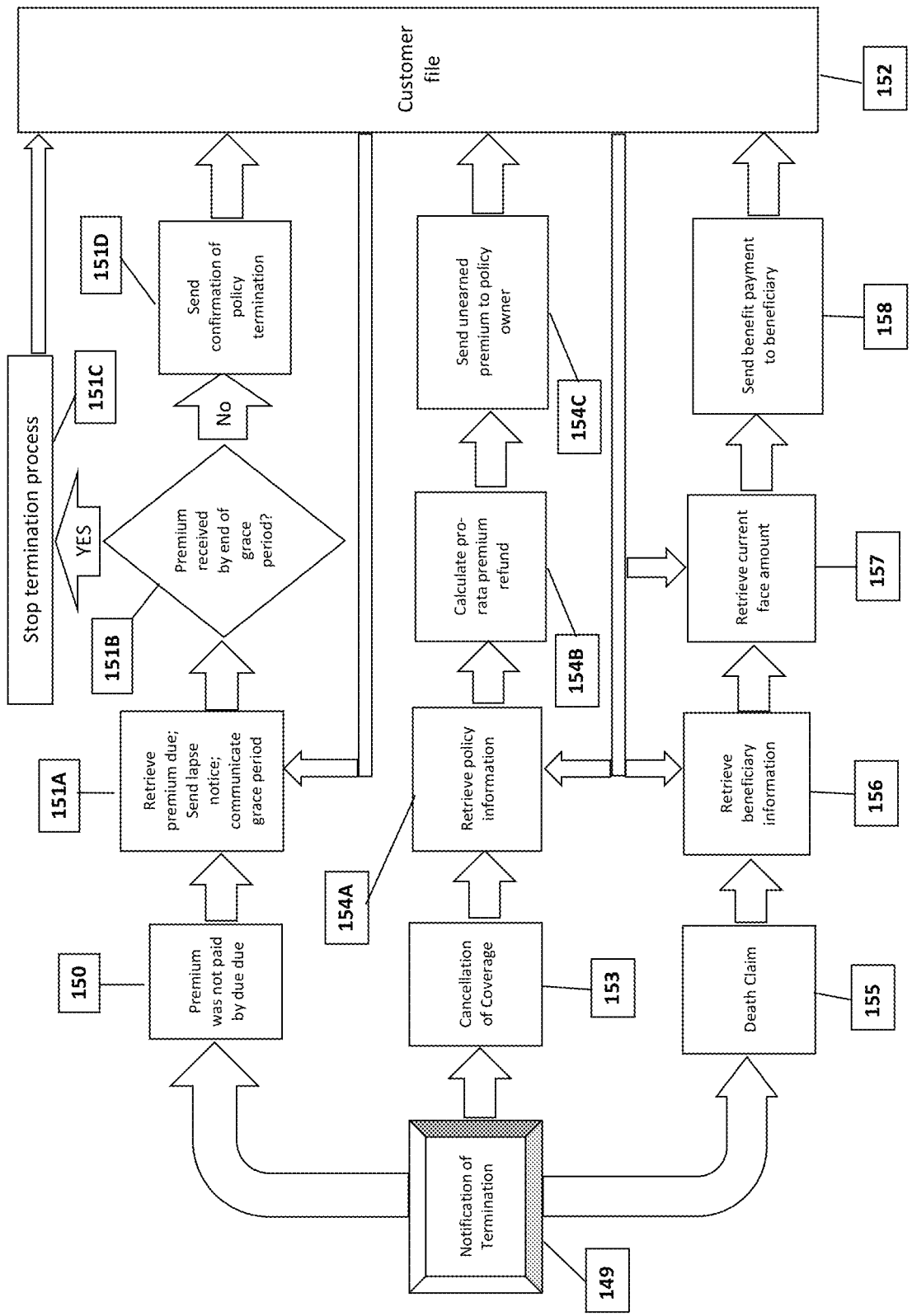
Fig 8 - Termination

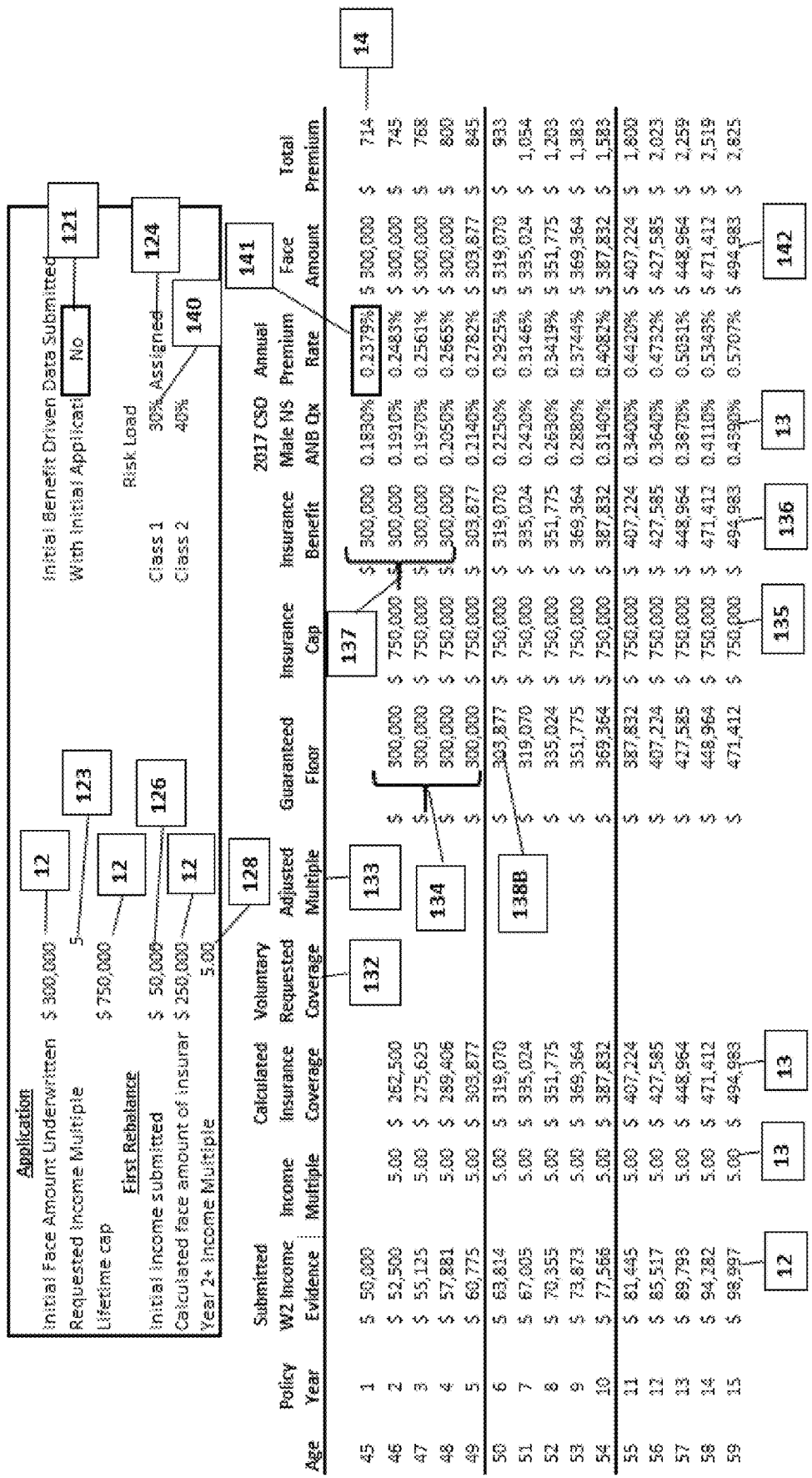
Fig 10 - Dynamic Income Protection Baseline Example - No Initial Data

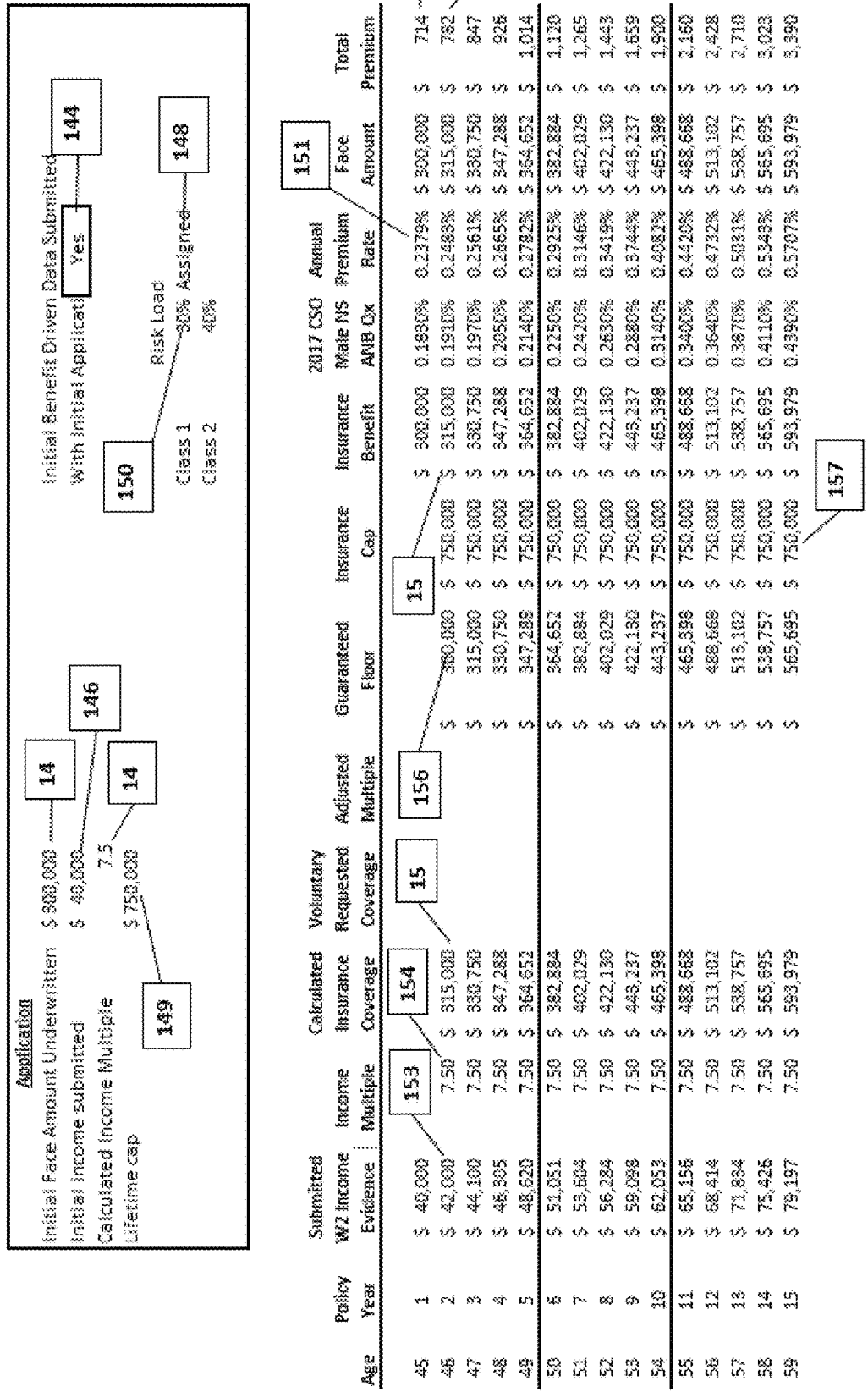
Fig 11 - Dynamic Income Protection Baseline Example - Initial Data Received

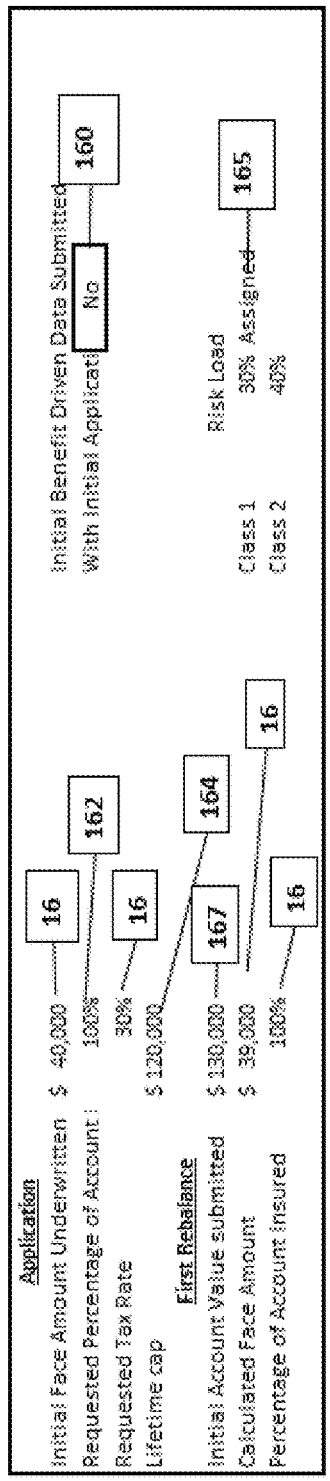
Fig 12 - Retirement Account Income Tax Baseline Example - No Initial Data Fig 13 - Retirement Account Income Tax Baseline Example - Initial Data Received

Application

| | | |
|---|---|---|
| Initial Face Amount Underwritten | $ 50,000 | Initial Benefit Driven Data Submitted |
| Requested Percentage of Account | 100% | With Initial Application: Yes |
| Initial Account Value submitted | $ 200,000 | |
| Requested Tax Rate | 30% | Risk Load |
| Calculated Face Amount | $ 60,000 | Class 1: 30% Assigned |
| Percentage of Account Insu | 83.33% | Class 2: 40% |
| Lifetime cap | $ 150,000 | |

| Age | Policy Year | Submitted W2 Income Evidence | Percentage Account Insured | Calculated Insurance Coverage | Voluntary Requested Coverage | Adjusted Multiple | Guaranteed Floor | Insurance Cap | Insurance Benefit | 2017 CSO Male NS ANB Ox | Annual Premium Rate | Face Amount | Total Premium |
|---|---|---|---|---|---|---|---|---|---|---|---|---|---|
| 45 | 1 | $ 200,000 | 83.33% | $ 52,500 | | | Not applicable | $ 150,000 | $ 50,000 | 0.1830% | 0.2379% | $ 50,000 | $ 119 |
| 46 | 2 | $ 210,000 | 83.33% | $ 52,500 | | | Not applicable | $ 150,000 | $ 52,500 | 0.1910% | 0.2483% | $ 52,500 | $ 130 |
| 47 | 3 | $ 220,500 | 83.33% | $ 55,125 | | | Not applicable | $ 150,000 | $ 55,125 | 0.1970% | 0.2561% | $ 55,125 | $ 141 |
| 48 | 4 | $ 231,525 | 83.33% | $ 57,881 | | | Not applicable | $ 150,000 | $ 57,881 | 0.2050% | 0.2665% | $ 57,881 | $ 154 |
| 49 | 5 | $ 243,101 | 83.33% | $ 60,775 | | | Not applicable | $ 150,000 | $ 60,775 | 0.2140% | 0.2782% | $ 60,775 | $ 169 |
| 50 | 6 | $ 255,256 | 83.33% | $ 63,814 | | | Not applicable | $ 150,000 | $ 63,814 | 0.2250% | 0.2925% | $ 63,814 | $ 187 |
| 51 | 7 | $ 268,019 | 83.33% | $ 67,005 | | | Not applicable | $ 150,000 | $ 67,005 | 0.2420% | 0.3146% | $ 67,005 | $ 211 |
| 52 | 8 | $ 281,420 | 83.33% | $ 70,355 | | | Not applicable | $ 150,000 | $ 70,355 | 0.2630% | 0.3419% | $ 70,355 | $ 241 |
| 53 | 9 | $ 295,491 | 83.33% | $ 73,873 | | | Not applicable | $ 150,000 | $ 73,873 | 0.2880% | 0.3744% | $ 73,873 | $ 277 |
| 54 | 10 | $ 310,266 | 83.33% | $ 77,566 | | | Not applicable | $ 150,000 | $ 77,566 | 0.3140% | 0.4082% | $ 77,566 | $ 317 |
| 55 | 11 | $ 325,779 | 83.33% | $ 81,445 | | | Not applicable | $ 150,000 | $ 81,445 | 0.3400% | 0.4420% | $ 81,445 | $ 360 |
| 56 | 12 | $ 342,068 | 83.33% | $ 85,517 | | | Not applicable | $ 150,000 | $ 85,517 | 0.3640% | 0.4732% | $ 85,517 | $ 405 |
| 57 | 13 | $ 359,171 | 83.33% | $ 89,793 | | | Not applicable | $ 150,000 | $ 89,793 | 0.3870% | 0.5031% | $ 89,793 | $ 452 |
| 58 | 14 | $ 377,130 | 83.33% | $ 94,282 | | | Not applicable | $ 150,000 | $ 94,282 | 0.4110% | 0.5343% | $ 94,282 | $ 504 |
| 59 | 15 | $ 395,986 | 83.33% | $ 98,997 | | | Not applicable | $ 150,000 | $ 98,997 | 0.4390% | 0.5707% | $ 98,997 | $ 565 |

Fig 14 - Dynamic Income Protection Lost Income Example - No Initial Data

Application

| | |
|---|---|
| Initial Face Amount Underwritten | $ 300,000 |
| Requested Income Multiple | 5 |
| Lifetime cap | $ 750,000 |

First Rebalance

| | |
|---|---|
| Initial income submitted | $ 100,000 |
| Calculated face amount of insuran | $ 500,000 |
| Year 2+ Income Multiple | 3.00 |

Initial Benefit Driven Data Submitted: No (192)
With Initial Applicati

Risk Load
Class 1    30% Assigned
Class 2    40%

| Age | Policy Year | Submitted W2 Income Evidence | Income Multiple | Calculated Insurance Coverage | Voluntary Requested Coverage | Adjusted Multiple | Guaranteed Floor | Insurance Cap | Insurance Benefit | 2017 CSO Male NS ANB Qx | Annual Premium Rate | Face Amount | Total Premium |
|---|---|---|---|---|---|---|---|---|---|---|---|---|---|
| 45 | 1 | $ 100,000 | | | | | | | $ 300,000 | 0.1830% | 0.2379% | $ 300,000 | $ 714 |
| 46 | 2 | $ 105,000 | 3.00 | $ 315,000 | | | | | 315,000 | 0.1910% | 0.2483% | $ 315,000 | $ 782 |
| 47 | 3 | $ 110,250 | 3.00 | $ 330,750 | | | | | 330,750 | 0.1970% | 0.2561% | $ 330,750 | $ 847 |
| 48 | 4 | $ 115,763 | 3.00 | $ 347,288 | | | | | 347,288 | 0.2050% | 0.2665% | $ 347,288 | $ 926 |
| 49 | 5 | $ 121,551 | 3.00 | $ 364,652 | | | | | 364,652 | 0.2140% | 0.2782% | $ 364,652 | $ 1,014 |
| 50 | 6 | $ 127,628 | 3.00 | $ 382,884 | | | $ 300,000 | $ 750,000 | 382,884 | 0.2250% | 0.2925% | $ 382,884 | $ 1,120 |
| 51 | 7 | $ 134,010 | 3.00 | $ 402,029 | | | 315,000 | 750,000 | 402,029 | 0.2420% | 0.3146% | $ 402,029 | $ 1,265 |
| 52 | 8 | $ - | 3.00 | $ - | | | 330,750 | 750,000 | 402,029 | 0.2630% | 0.3419% | $ 402,029 | $ 1,375 |
| 53 | 9 | $ - | 3.00 | $ - | | | 347,288 | 750,000 | 402,029 | 0.2880% | 0.3744% | $ 402,029 | $ 1,505 |
| 54 | 10 | $ 70,000 | 3.00 | $ 210,000 | | | 364,652 | 750,000 | 402,029 | 0.3140% | 0.4082% | $ 402,029 | $ 1,641 |
| 55 | 11 | $ 73,500 | 3.00 | $ 220,500 | | | 382,884 | 750,000 | 402,029 | 0.3400% | 0.4420% | $ 402,029 | $ 1,777 |
| 56 | 12 | $ 77,175 | 3.00 | $ 231,525 | | | 402,029 | 750,000 | 402,029 | 0.3640% | 0.4732% | $ 402,029 | $ 1,902 |
| 57 | 13 | $ 81,034 | 3.00 | $ 243,101 | | | 402,029 | 750,000 | 402,029 | 0.3870% | 0.5031% | $ 402,029 | $ 2,023 |
| 58 | 14 | $ 85,085 | 3.00 | $ 255,256 | | | 402,029 | 750,000 | 402,029 | 0.4110% | 0.5343% | $ 402,029 | $ 2,148 |
| 59 | 15 | $ 89,340 | 3.00 | $ 268,019 | | | 402,029 | 750,000 | 402,029 | 0.4390% | 0.5707% | $ 402,029 | $ 2,294 |

Fig 15 - Dynamic Income Protection Voluntary Face Reduction Example - No Initial Data

Application

| | |
|---|---|
| Initial Face Amount Underwritten | $ 300,000 |
| Requested Income Multiple | 5 |
| Lifetime cap | $ 750,000 |

Initial Benefit Driven Data Submitted
With Initial Application: No

Risk Load
Class 1    30% Assigned
Class 2    40%

First Rebalance

| | |
|---|---|
| Initial Income submitted | $ 60,000 |
| Calculated face amount of Insurer | $ 300,000 |
| Year 2+ Income Multiple | 5.00 |

| Age | Policy Year | Submitted W2 Income Evidence | Income Multiple | Calculated Insurance Coverage | Voluntary Requested Coverage | Adjusted Multiple | Guaranteed Floor | Insurance Cap | Insurance Benefit | 2017 CSO Male NS ANB Qx | Annual Premium Rate | Face Amount | Segment Cap | Total Premium |
|---|---|---|---|---|---|---|---|---|---|---|---|---|---|---|
| 45 | 1 | $ 60,000 | | | | | | | $ 300,000 | 0.1830% | 0.2379% | $ 300,000 | $ 750,000 | $ 714 |
| 46 | 2 | $ 63,000 | 5.00 | $ 315,000 | | | | | $ 315,000 | 0.1910% | 0.2483% | $ 315,000 | $ 750,000 | $ 782 |
| 47 | 3 | $ 66,150 | 5.00 | $ 330,750 | | | | | $ 330,750 | 0.1970% | 0.2561% | $ 330,750 | $ 750,000 | $ 847 |
| 48 | 4 | $ 69,458 | 5.00 | $ 347,288 | | | | | $ 347,288 | 0.2050% | 0.2665% | $ 347,288 | $ 750,000 | $ 926 |
| 49 | 5 | $ 72,930 | 5.00 | $ 364,652 | | | | | $ 364,652 | 0.2140% | 0.2782% | $ 364,652 | $ 750,000 | $ 1,014 |
| 50 | 6 | $ 76,577 | 5.00 | $ 382,884 | | | | | $ 382,884 | 0.2250% | 0.2925% | $ 382,884 | $ 750,000 | $ 1,120 |
| 51 | 7 | $ 80,406 | 5.00 | $ 402,029 | $ 150,000 | 1.87 | $ 150,000 | $ 750,000 | $ 150,000 | 0.1420% | 0.3146% | $ 150,000 | $ 750,000 | $ 472 |
| 52 | 8 | $ 84,426 | 1.87 | $ 157,500 | | | | $ 750,000 | $ 157,500 | 0.2630% | 0.3419% | $ 157,500 | $ 750,000 | $ 538 |
| 53 | 9 | $ 88,647 | 1.87 | $ 165,375 | | | | $ 750,000 | $ 165,375 | 0.2880% | 0.3744% | $ 165,375 | $ 750,000 | $ 619 |
| 54 | 10 | $ 93,080 | 1.87 | $ 173,644 | | | | $ 750,000 | $ 173,644 | 0.3140% | 0.4082% | $ 173,644 | $ 750,000 | $ 709 |
| 55 | 11 | $ 97,734 | 1.87 | $ 182,326 | | | | $ 750,000 | $ 182,326 | 0.3400% | 0.4420% | $ 182,326 | $ 750,000 | $ 806 |
| 56 | 12 | $ 102,620 | 1.87 | $ 191,442 | | | | $ 750,000 | $ 191,442 | 0.3640% | 0.4732% | $ 191,442 | $ 750,000 | $ 906 |
| 57 | 13 | $ 107,751 | 1.87 | $ 201,014 | | | | $ 750,000 | $ 201,014 | 0.3870% | 0.5031% | $ 201,014 | $ 750,000 | $ 1,011 |
| 58 | 14 | $ 113,139 | 1.87 | $ 211,065 | | | | $ 750,000 | $ 211,065 | 0.4110% | 0.5343% | $ 211,065 | $ 750,000 | $ 1,128 |
| 59 | 15 | $ 118,796 | 1.87 | $ 221,618 | | | | $ 750,000 | $ 221,618 | 0.4390% | 0.5707% | $ 221,618 | $ 750,000 | $ 1,265 |

Fig 16 - Dynamic Income Protection Voluntary Face Increase Example – No Initial Data

Application
- Initial Face Amount Underwritten: $300,000
- Requested Income Multiple: 5
- Lifetime cap: $750,000

First Rebalance
- Initial income submitted: $100,000
- Calculated Face amount of Insurer: $500,000
- Year 2+ Income Multiple: 3.00

Initial Benefit Driven Data Submitted With Initial Application: No

Risk Load:
- Class 1: 30% Assigned At Issue
- Class 2: 40% Year 7 Increase

| Age | Policy Year | Submitted W2 Income Evidence | Pre-Cap Income Multiple | Pre-Cap Calculated Coverage | Voluntary Requested Coverage | Adjusted Multiple | Guaranteed Floor | Aggregate Insurance Cap | Total Insurance Benefit | 2017 CSO Male NS AMB Qx | Risk Load | Initial Segment of Issuance — Annual Premium Rate | Initial Segment — Face Amount | Initial Segment — Segment Cap | Year 7 Segment — Annual Premium Rate | Year 7 Segment — Face Amount | Year 7 Segment — Segment Cap | Total Premium |
|---|---|---|---|---|---|---|---|---|---|---|---|---|---|---|---|---|---|---|
| 45 | 1 | $100,000 | 3.00 | | | | | $750,000 | $300,000 | 0.1830% | | 0.2379% | $300,000 | $750,000 | | | | $723 |
| 46 | 2 | $105,000 | 3.00 | $315,000 | | | | $750,000 | $315,000 | 0.1910% | | 0.2483% | $315,000 | $750,000 | | | | $782 |
| 47 | 3 | $110,250 | 3.00 | $330,750 | | | | $750,000 | $330,750 | 0.1970% | | 0.2561% | $330,750 | $750,000 | | | | $847 |
| 48 | 4 | $115,763 | 3.00 | $347,288 | | | | $750,000 | $347,288 | 0.2050% | | 0.2665% | $347,288 | $750,000 | | | | $926 |
| 49 | 5 | $121,551 | 3.00 | $364,652 | | | | $750,000 | $364,652 | 0.2140% | | 0.2782% | $364,652 | $750,000 | | | | $1,014 |
| 50 | 6 | $127,628 | 3.00 | $382,884 | | | | $750,000 | $382,884 | 0.2250% | | 0.2925% | $382,884 | $750,000 | | | | $1,120 |
| 51 | 7 | $165,917 | 3.00 | $497,750 | $829,583 | 5.00 | $829,583 | $1,400,000 | $829,583 | 0.2420% | | 0.3146% | $497,750 | $750,000 | 0.3383% | ####### | $650,000 | $2,890 |
| 52 | 8 | $174,213 | 3.00 | $522,637 | | | $871,062 | $1,400,000 | $871,062 | 0.2590% | | 0.3367% | $522,637 | $750,000 | 0.3682% | ####### | $650,000 | $3,079 |
| 53 | 9 | $182,923 | 3.00 | $548,769 | | | $914,615 | $1,400,000 | $914,615 | 0.2880% | | 0.3744% | $548,769 | $750,000 | 0.4032% | ####### | $650,000 | $3,530 |
| 54 | 10 | $213,362 | 5.00 | $1,051,808 | | | $1,051,808 | $1,400,000 | $1,051,808 | 0.3140% | | 0.4082% | $631,085 | $750,000 | 0.4396% | ####### | $650,000 | $4,436 |
| 55 | 11 | $220,898 | 5.00 | $1,104,398 | | | $1,104,398 | $1,400,000 | $1,104,398 | 0.3400% | | 0.4420% | $662,639 | $750,000 | 0.4766% | ####### | $650,000 | $5,032 |
| 56 | 12 | $233,924 | 5.00 | $1,169,618 | | | $1,159,618 | $1,400,000 | $1,159,618 | 0.3640% | | 0.4732% | $695,771 | $750,000 | 0.5099% | ####### | $650,000 | $5,558 |
| 57 | 13 | $243,520 | 5.00 | $1,217,599 | | | $1,217,599 | $1,400,000 | $1,217,599 | 0.3870% | | 0.5031% | $739,559 | $750,000 | 0.5416% | ####### | $650,000 | $6,114 |
| 58 | 14 | $255,696 | 5.00 | $1,278,479 | | | $1,217,599 | $1,400,000 | $1,263,381 | 0.4110% | | 0.5343% | $750,000 | $750,000 | 0.5758% | ####### | $650,000 | $6,550 |
| 59 | 15 | $268,481 | 5.00 | $1,342,403 | | | $1,261,391 | $1,400,000 | $1,286,961 | 0.4390% | | 0.5707% | $750,000 | $750,000 | 0.6146% | ####### | $650,000 | $7,369 |

Income Multiple of 3.0 (initial) / Income Multiple of 2.0 (Year 7)

1700

1710 – Combining a life insurance policy from an insurance company with independent data specific to an insured individual to form a dynamic death benefit life insurance policy

1720 – Determining a category for the dynamic death benefit based on a life insurance need of the insured individual

1730 – Determining qualifying data to calculate a dynamic death benefit of the life insurance policy based on the category of insurance coverage

1740 – Determining a frequency and timing of a data refresh based on the category of the dynamic death benefit and contractual requirements being serviced for the insured individual's insurance policy

1750 – Retrieving data specific to the category of insurance on the insured individual seeking life insurance coverage to recompute a death benefit

1760 – Retrieving rules and limitations on changes to the life insurance policy's recomputed death benefit specific to the category of coverage and that policy's particular circumstances

1770 – Determining a life insurance policy's revised death benefit, automatically and without new underwriting

1780 – Servicing the life insurance policy with a death benefit that is dynamically redetermined periodically based on independent data unique to the category of insurance coverage and specific to the individual seeking life insurance benefits changing dynamically as represented by the independent data

METHODS AND SYSTEMS FOR ADMINISTERING INSURANCE PRODUCTS WITH DEATH BENEFITS AUTOMATICALLY ADJUSTED WITHOUT UNDERWRITING BASED ON INDEPENDENT DATA CORRELATED WITH AN INSURED INDIVIDUALS NEED FOR LIFE INSURANCE BENEFITS

CROSS-REFERENCE TO RELATED APPLICATIONS

This application is a continuation-in-part of U.S. patent application Ser. No. 17/853,038, filed on Jun. 29, 2022 which claims priority under 35 U.S.C. § 119(e) to U.S. Provisional Patent Application Ser. No. 63/216,835, filed on Jun. 30, 2021, U.S. Provisional Patent Application Ser. No. 63/257,365, filed on Oct. 19, 2021, U.S. Provisional Patent Application Ser. No. 63/257,325, filed on Oct. 19, 2021, U.S. Provisional Patent Application Ser. No. 63/257,377, filed on Oct. 19, 2021, U.S. Provisional Patent Application Ser. No. 63/257,353, filed on Oct. 19, 2021, and U.S. Provisional Patent Application Ser. No. 63/312,549, filed on Feb. 22, 2022, the contents of which are hereby incorporated by reference in their entireties for all purposes.

TECHNICAL FIELD

This disclosure relates generally to life insurance products and more particularly to methods and systems for administering life insurance products with death benefits automatically adjusted without underwriting based on independent data correlated with an insured individuals need for life insurance benefits.

BACKGROUND

Consumers purchase life insurance to provide for various needs. The most common reason for buying life insurance is to protect the insured's (e.g., insured individual) income which others are dependent upon (e.g., spouse and children). Financial planners will recommend people buy enough life insurance to replace several years of income where the "income multiple" is based on the insured's situation (years to retirement, number and age of children, savings and investments, debts, legacy objectives such as contributing to a charitable organization).

People also purchase life insurance for a specific purpose such as the extinguishment of debt upon death. Burial insurance policies are purchased to pay for end-of-life expenses such as the funeral. Pre-need life insurance policies are purchased while planning their own funeral and the policy's death benefit is assigned to the insured's pre-selected funeral home.

Financial planners and insurance agents consider many taxes that will be due upon death and recommend life insurance to avoid forced liquidation of assets to pay the taxes triggered by the insured's death. Wealthy individuals subject to federal estate taxes often buy permanent life insurance to fund estate taxes. The life insurance proceeds help prevent liquidation of the family's main asset such as a business or farm to pay the estate taxes.

Defined contribution retirement assets such as Individual Retirement Accounts (IRAs) and employer-sponsored 401 Ks are examples of assets that create taxes upon ownership transfer at death. In some situations, the insured's death will create taxes that can be deferred over a specific time or until the death of the beneficiary. Federal estate tax and retirement account transfer situations are two examples. Spousal beneficiaries may defer the tax payment. This complicates the life insurance planning since individuals often get divorced, remarry, and/or the spouse's death precedes the insured's death.

Businesses utilize life insurance for covering key employees to help offset the financial impact of a death. Small business owners with other business partners often buy life insurance on the other partners as the means to support the buy-out the deceased partner's ownership.

In nearly all these situations, the amount of death benefit needed is constantly changing. Consumer income increases over time which may require more life insurance. Mortgages or other debts tend to decline, reducing the need for life insurance. Insurance needed to buy out the ownership of a deceased business partner changes with the value of the business. Federal estate taxes are particularly volatile due to changing wealth and changes in the tax code. Congress periodically updates the federal estate tax exemption levels and the federal estate tax rate, making life insurance planning difficult since the benefit is fixed at purchase.

While consumers need life insurance for a variety of situations that evolve over time, the industry offers individual products that have fixed death benefits (also called the "face amount", "specified amount", or coverage). The individual applies for insurance and the insurance company underwrites the policy from both a medical and financial perspective. Approved policies get assigned an underwriting class which determines the premium rate or cost of insurance deduction from a universal life insurance policy with a cash value account. Once coverage is approved and issued, the insured's underwriting class is set for the life on that coverage.

Fixed life insurance benefits do not align very well with a consumer's need for insurance benefits that evolve over time. The result is an emerging gap between the coverage and the amount of insurance needed. Consumer's needing more benefits can apply for more life insurance, but underwriting will be required. The additional coverage requested may be offered at a higher price because of a change in health or rejected if they have become uninsurable.

Carriers require a minimum amount of insurance for a new policy (e.g., $100,000 face amount is a typical minimum). If the consumer does not need this much additional coverage they are forced to choose between over-buying or not buying the policy and being under-insured. Even when small amounts of additional coverage are available, the unit price may be high due to fixed administrative expenses built into the premium.

Using a fixed benefit policy when the insurance need declines over time will result in over-insurance, wasting money on insurance they do not need. Most products are sold on a 'level premium' basis meaning the rising cost of mortality as people get older is 'levelized' over a set period such as 10, 20 or 30 years. Effectively, consumers over-pay for the coverage in the early years relative to the underlying mortality cost for that age. If the consumer eventually decreases their life insurance coverage before the end of the term, the advantage of prepaying for future coverage will be forfeited. Annual renewable pricing structures avoid this prepayment risk to the consumer by aligning the premium each year with the insured's age and underwriting class. Unfortunately, annual renewable term products are seldom sold by agents due to the lower commissions.

Group term life insurance market is one product type with death benefits that partially evolve with the consumer's insurance need. Many businesses provide life insurance to their employees as part of the benefit package. Typically, the employee's death benefit is 1-2 times the employee's salary up to a capped amount such as $50,000. Since the employer is buying coverage on all employees, there is no individual underwriting. Underwriting is done at the employer level based on employee demographics and claims experience for that employer's industry. The death benefit changes annually since it is based on the person's salary. The benefit is a relatively small multiple of the employee's salary and the cap further hinders the benefit for the higher salaried employees. Group term products also may lack portability. The coverage may cease with the employment, a major drawback to anybody with health issues.

The life insurance market needs individual products that automatically evolve with consumer's changing need for life insurance benefits. Automatic increases in benefits without new underwriting would help reduce the coverage gap for the consumer currently caused by fixed benefit products. Insureds that experience changes in health could maintain the amount of insurance needed without the risk of unaffordable premiums or rejection for more coverage. Automatic reduction in benefits when the insured's need for life insurance decreases would offer convenience and consumer savings.

Automatic changes in benefits without underwriting presents a risk to the insurance company but could be an acceptable and manageable risk if two important criteria were met: a) the data used to recalculate one's insurance benefit was correlated to the individual's need for life insurance, and b) the data could not be influenced or controlled by the insured, thus preventing the possibility of anti-selection.

Creating a method and system to automatically change a life insurance policy's benefit must be carefully designed and administered to protect both the insured and the insurance carrier. The nature of the data used to represent the change in the insured's need for life insurance is an important filter in how the change in benefits are administered. In some cases, the data may only correlate with the insured's benefit need in one direction while in other cases the data may be correlated to the need for insurance in both directions. For example, linking life insurance benefits to an insured's income has a positive correlation when the income is rising (e.g., earning more income will likely translate to higher insurance needs) but decreasing income may signal health issues rather than signaling a need for less life insurance. In contrast, life insurance designed to pay the tax on qualified retirement accounts upon death is a dual correlation: the amount of tax (and hence the death benefit needed) moves up and down with the data (e.g., the value of the retirement account).

A user interface communicating in real-time with the administrative system will be important during the marketing and policy application process. A dynamic benefit life insurance buyer will want to simulate the future death benefits and premiums before applying for the policy. While the premium rate per unit by age can be estimated, the premium amount depends on the benefit amount which is not known. A user interface can forecast the insured's future data which in turn can provide information on the death benefit provided by the policy and the premium each year for that forecasted benefit. Since the insurance company will manage its risk to significant increases in death benefits without new underwriting, limits such as caps on the annual increase and/or cumulative increase can be imposed. The user interface's simulation capabilities will help the buyer understand when upward adjustments to the benefits would be limited. Understanding when the limits would be imposed prior to submitting the policy application helps the buyer determine if they wish to increase the initial amount of coverage on the application. Applying for additional benefits will increase the premium and the user interface provides the buyer information to make an informed decision on the trade-off.

From the insurance carrier's perspective, the user interface will improve the efficiency of the application process and avoid underwriting and other policy issue expenses. If a buyer applied for a policy without knowing the limits on the dynamic adjustment prior to the application, and learned about such limits when the policy was delivered, the buyer could reject the policy and apply for a new one that better meets their needs. In the life insurance industry, "approved but not taken" applications are costly to insurance companies. A dynamic death benefit policy inherently comes with uncertainty to a buyer, including, for example, the amount of future death benefits, the limitations imposed and the cost for the coverage. A user interface that communicates in real-time with the administrative system during the marketing and application process considerably improves the buyer's understanding of the benefits and cost and will significantly improve the persistency of the business.

SUMMARY

Embodiments disclosed herein are directed to a computer system and method for administering a life insurance policy with a death benefit that is automatically adjusted without underwriting, and a user interface to simulate the future benefits and premiums. The death benefit adjustment is based on specific data unique to the individual and the purpose of the insurance. Furthermore, the methods and systems must consider the goal of the insurance and incorporate adjustments that protect both the insured and consumer from unintended consequences.

Embodiments disclosed herein involve identifying the category of life insurance coverage being provided (e.g., what is the consumer's need). The benefit category determines the acceptable data and the methods, constraints, and calculation procedures that will be deployed.

Embodiments disclosed herein include validating that the source of data meets pre-specified criteria to qualify. The system and method must evaluate the data source, validate its eligibility, and process it accordingly. For example, life insurance benefits linked to retirement accounts may have to exclude certain types of retirement accounts from eligibility.

Embodiments disclosed herein incorporate into the methods and procedures when the initial data linked to the insurance need is submitted by the applicant or retrieved directly from the third-party source. Consumers submit a life insurance application with a requested face amount of insurance coverage. The policy requested will reflect how the death benefits will be automatically adjusted in the future. In some cases, the initial data will be known at the time of the original application and the invention's methods and procedures can reconcile the data with the requested coverage and make the necessary adjustments. In other cases, the initial data will not be known at the time of the original application.

Embodiments disclosed herein include administering a life insurance policy having a death benefit which is periodically adjusted based on the data uploaded from the insured and/or retrieved from an independent third-party.

The system verifies the eligibility of the data and computes the preliminary benefit to take effect on the forthcoming rebalance date.

Embodiments disclosed herein include administering the final calculation of the new benefit. The methods and system retrieve the preliminary benefit and apply the specified formulas, caps, and floors to compute the new death benefit. Each benefit category has its own specifications that must be administered in calculating the change in the death benefit to protect the carrier from unnecessary risk and protect the insured from an unintended decrease in coverage.

Embodiments disclosed herein include administering the calculation of the new premium for the life insurance coverage due to the rebalanced benefit. The system and methods calculate the updated premium based on the insured's underwriting class, age, sex and other classifications that are established upon initial underwriting.

Embodiments disclosed herein include administering the insurance policy and its automatically changing benefits from third-party data sources that may change over time and incorporate multiple data sources for the same period. In effect, the embodiments disclosed herein facilitate "portable" insurance coverage where the data representing the amount of benefit needed can come from changing or different sources. For example, linking the life insurance benefit to the insured's income requires the system and methods to accommodate the insured changing employers changing over time (e.g., if the third-party data source is the employer) and/or the insured working multiple jobs (e.g., gathering income data from multiple sources). Another example is life insurance being linked to the insured's retirement account. The system and methods accommodate the insured having multiple retirement accounts and/or the insured switching retirement account administrators.

Embodiments disclosed herein describe the process of the systems and methods of analyzing a) life insurance benefits adjusting automatically to changes in insured's income; or b) life insurance benefits adjusting automatically to changes in retirement account balances. Embodiments disclosed herein are also directed to automatic changes for life insurance benefits, up or down, linked to third-party data relevant to the insured's need for life insurance. Each benefit category is unique in how the data is utilized, what filters and constraints must be applied to protect both the insured and insurance carrier from unintended consequences.

Embodiments disclosed herein are directed to life insurance benefits automatically changing to reduction in mortgage balances and other debts. This benefit category has a different risk profile to the insurance company from the other benefit categories covered since the primarily and consistently declines with debt payments. Embodiments disclosed herein are directed to solving the consumer's problem of insurance benefit needs rising and providing coverage that automatically increases with the need without additional underwriting evidence on the insured.

In one embodiment the computer system receives an application from a potential insured and determines which benefit category being requested. Based on the category assessment, the computer system identifies and records the type of data needed, the insured's particular third-party data source, the rebalance date cycle and deadlines for obtaining the data to process the new benefit calculations.

In one embodiment the computer system processes an application, issues a policy, and determines whether the initial data underlying the insurance need has been obtained. If the data has been received, the system performs calibration tests to align the life insurance requested on the application with the formulas and factors that will be applied to future data received to calculate the benefits. If the data has not been received, the system processes the application while storing the requested benefit determination factors and performs the calibration tests when the data is eventually received. Upon receiving the data, the system will perform the calibration tests and adjust the benefit determination factors, if necessary.

Embodiments Specific to the Income-Linked Category Selected

In one embodiment the computer system receives an application from a potential insured seeking life insurance benefits linked to their income, reviews the initial death benefit coverage requested, reviews the requested 'income multiple' that will be used to determine future benefits, determines what information is needed to assess the underwriting classification, orders such information, retrieves the underwriting data from the service providers, and applies the underwriting criteria to determine the underwriting classification and premium amount. The method described herein assumes the insured uploaded income documentation to establish a baseline for recomputing benefits on the first policy anniversary. Alternatively, the computer system may establish electronic data feed links from the employer, Internal Revenue Service, or another third-party possessing the insured's income data.

In one embodiment the computer system and method determine the lifetime cap on the policy benefit that may be earned from increasing income without additional underwriting evidence. Factors that determine the lifetime cap for a newly issued policy include the face amount, medical underwriting class, age, requested income multiple, macro trends on wage inflation and mortality rates, among others. For policies already insured but requesting more coverage, the computer system and method may incorporate other variables into the analysis such as the insured's historical income trends and prior underwriting class decisions.

In one embodiment the computer system analyzes submitted documentation on the insured's initial income, retrieves the desired income multiple, and determines the preliminary calculated insurance benefits. The computer system and method compare the preliminary calculated insurance benefits to the approved face amount and determine the new face amount and any potential adjustments to the approved 'income multiple'. The computer system informs the policy owner of the new benefit amount and revised premium.

In one embodiment the computer system retrieves income data submitted by the policy owner and calculates the benefit amount using the approved income multiplier. If the result is a decrease in insurance benefits, the system and method do not change the insurance benefits. If the new benefit amount exceeds the policy's lifetime cap, the increase in benefit is limited by the total coverage allowed. The revised premium will be based on the insured's current age and underwriting class.

In one embodiment the computer system receives a request from the policyholder to decrease policy benefits. The system computes the equivalent 'income multiple' of insurance face amount based on the recorded income at the time of the request, adjusts the 'income multiple' and stores it for determining future benefits. The system and method determine any applicable refunds in unearned premium, update the customer records, and process refunds due.

In one embodiment the computer system receives a policy owner request to increase the policy's income multiple which will increase the total face amount based on the reported income at the time of the request. The computer system and method determine the net increase in face amount to the insurance company, retrieve the necessary information to determine the underwriting decision, and issue the increased coverage at the approved underwriting class. The system and method compare the new underwriting class to the existing coverage underwriting class, upgrading the old rate class if the new rate class is more favorable.

Embodiments Specific to the Retirement Account Tax Category Selected

In one embodiment the computer system receives an application from a potential insured seeking life insurance benefits linked to their retirement account, reviews the initial death benefit coverage requested, reviews the requested tax rate that will be used to determine future benefits, determines what information is needed to assess the underwriting classification, orders such information, retrieves the underwriting data from the service providers, and applies the underwriting criteria to determine the underwriting classification and premium amount. The method described herein assumes the insured uploaded specified types of income documentation to establish a baseline for recomputing benefits on the first policy anniversary. Alternatively, the computer system establishes electronic data feed links from the retirement account administrator or another third-party possessing the account data.

In one embodiment the computer system and method determine the lifetime cap on the policy benefit that may be earned from an increasing retirement account value without additional underwriting evidence. Factors that determine the lifetime cap for a newly issued policy include the face amount, medical underwriting class, age, requested tax rate, macro analysis on interest rates and investment returns, and mortality rates, among others. For policies already insured but requesting more coverage, the computer system and method may incorporate other variables into the analysis such as the insured's historical retirement account investment returns, plan contributions, and prior underwriting class decisions.

In one embodiment the computer system analyzes submitted documentation on the insured's initial retirement account balance, retrieves the desired tax rate, and determines the preliminary calculated insurance benefits. The computer system and method compare the preliminary calculated insurance benefits to the approved face amount and determine the new year's face amount and any potential adjustments to the portion of the account insured. The computer system informs the policy owner of the new benefits and premium.

In one embodiment the computer system reads the reported account data on documentation or data submitted by the policy owner or retrieved from the third-party source and determines the calculated insurance benefits using the approved tax rate and portion of account insured. If the new insurance benefit exceeds the policy's lifetime cap, the increase in benefit is limited by the total coverage allowed unless new underwriting is performed. The new premium will be based on the insured's current age and underwriting class.

In one embodiment the computer system receives a request from the policyholder to decrease policy benefits. The system computes the equivalent account percentage that is insured based on the requested insurance face amount and tax rate. The computer system stores that benefit determination factor for future use in determining the benefit amount. The system and method determine any applicable refunds from unearned premium, update the customer records, and process refunds due.

In one embodiment the computer system receives a policy owner request to increase the policy's tax rate which will increase the total face amount based on the reported account value at the time of the request. The computer system and method determine the net increase in face amount, retrieve the necessary information to determine the underwriting decision, and issue the increased coverage at the approved underwriting class. The system and method compare the new underwriting class to the existing coverage underwriting class, upgrading the old rate class if the new rate class is more favorable.

Embodiments Applicable to all Life Insurance Need Categories

In one embodiment that relates to benefits tied to other types of data (e.g., estate taxes, small business valuations or investment losses), the general principle of "increases tied to specific data/events and decreases that the insured may elect at any time" applies in the same manner as the embodiments for income and retirement assets already described above.

In one embodiment the computer system and method are notified of a request for policy termination either by failure to pay the premium (triggering a policy to lapse) or an explicit request by the policy owner to terminate the coverage and refund premium paid but not yet earned. The computer updates the customer coverage file, computes any premium refund due, and processes the payment to the policy owner.

In one embodiment the computer system and method are notified of the insured's death, retrieves the current period benefit, and pays the death benefit to the beneficiary.

In one embodiment the user interface receives information on an applicant (e.g., age, gender), self-assessment on health status to estimate the underwriting class before formal application, coverage category, and the coverage category selected. Based on the category selected, the interface displays the input fields for the applicant to complete so the system can simulate the future data that will determine the death benefits and premiums. The user interface communicates in real-time with the computer system and method administering the policies to simulate the death benefits and determine any limitations that would be imposed under that scenario. The interface provides options for the user to select what type of information is displayed (e.g., the annual amount, the yearly change) and the format of the information displayed (e.g., numerical tables, graphs). Once the buyer is ready to submit an application to the insurance company, the user interface provides a gateway to start the formal application. The user interface also provides an account login gateway to complete an application in process, submit documentation supporting automatic benefit changes, get updates on changes in premium and benefits, and request other policy changes.

BRIEF DESCRIPTION OF THE DRAWINGS

To facilitate further description of the embodiments, the following drawings are provided in which:

FIG. 1 is the process chart for a new application to determine the benefit category and identify whether the application includes the initial data needed to compute the benefit determination factors, according to certain embodiments;

FIG. 2 is the process chart for onboarding a new application submitted with the initial benefit driven data, according to certain embodiments;

FIG. 3 is the process chart for onboarding a new application submitted without the initial benefit driven data, according to certain embodiments;

FIG. 4 is a process chart for the first rebalance cycle when the initial benefit driven data was not received with the initial application, according to certain embodiments;

FIG. 5A is a process chart for the ongoing rebalance cycle for the earned income benefit category, according to certain embodiments;

FIG. 5B is a process chart for the ongoing rebalance cycle for the retirement account income tax benefit category, according to certain embodiments;

FIG. 6 is a process chart for the customer change requests, according to certain embodiments;

FIG. 7 is a process chart for the lifetime cap determination, according to certain embodiments;

FIG. 8 is a process chart for the termination notification, according to certain embodiments;

FIG. 10 is an example of applying the methods and procedures to an automatic adjustment income linked benefit policy that is applied without the initial benefit data, according to certain embodiments;

FIG. 11 is an example of applying the methods and procedures to an automatic income linked benefit policy that is applied with the initial benefit data, according to certain embodiments;

FIG. 12 is an example of applying the methods and procedures to an automatic changing benefit tied to retirement account income tax that is applied without the initial benefit data, according to certain embodiments;

FIG. 13 is an example of applying the methods and procedures to an automatic changing benefit tied to retirement account income tax that is applied with the initial benefit data, according to certain embodiments;

FIG. 14 is an example of applying the methods and procedures to an automatic changing benefit tied to income (without the initial benefit data on the application) where the insured experiences significant reduction in earned income, according to certain embodiments;

FIG. 15 is an example of applying the methods and procedures to an automatic changing benefit tied to income when the insured requests a lower face amount and the policy's income multiple (e.g., benefit determination factor) is adjusted, according to certain embodiments;

FIG. 16 is an example of applying the methods and procedures to an automatic changing benefit tied to income where the insured requests an increase in face amount (thus requesting a higher income) and a second segment of insurance is created due to a different underwriting class, according to certain embodiments;

FIG. 17 illustrates a flowchart for a method, according to certain embodiments;

FIG. 20 illustrates an example user interface in accordance with certain embodiments simulating a dynamic benefits policy where the death benefits are linked to the insured's 401K/IRA account balance.

Figure 9:
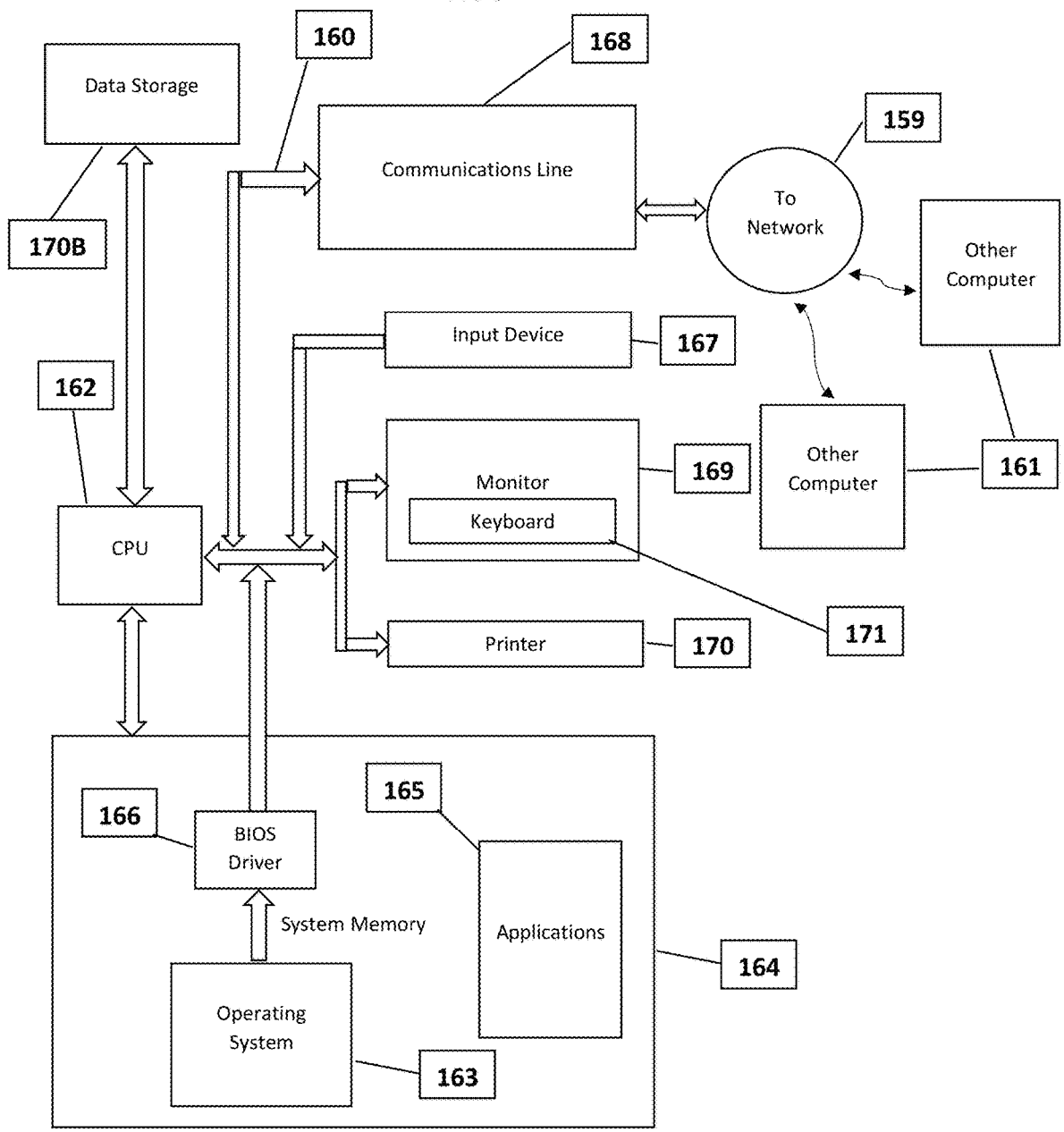
FIG. 9 is a computer-based network structure to handle the business methods necessary to administer the automatic adjustment insurance benefit policy invention, according to certain embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "dynamically" can, in some embodiments, be defined as a life insurance policy death benefit that is changed periodically in response to a change in specific data that is external and independent to the life insurance policy.

As defined herein, "automatically" can, in some embodiments, be defined as a change in the policy's death benefit that occurs neither without a request by the policy owner for such change nor can be rejected by the policy owner (particularly when the death benefit is being reduced).

As defined herein, "servicing" can, in some embodiments, be defined as administrative functions of a life insurance policy such as the calculation and collection of premiums, payment of claims, preparing and distributing annual statements, handling requests for changing the beneficiary, and processing a voluntary reduction in benefits. In some embodiments, "servicing" can be defined as modifying a graphical user interface (GUI) to present an insured individual (e.g., an insured) with a life insurance product.

DESCRIPTION OF EXAMPLES OF EMBODIMENTS

Embodiments disclosed herein comprise a computer system and method for providing a life insurance product whose death benefit is periodically adjusted based on data linked to the insured's need for several life insurance benefit categories. Embodiments disclosed herein accommodate situations where the initial baseline data for the benefit calculation is received simultaneously with the initial policy application as well as situations where the policy is underwritten and issued before the underlying base data used to determine the benefits has been received. As discussed in more detail below, benefit, death benefit, insurance coverage and face amount of the policy are used interchangeably.

FIG. 1 is a process chart describing the initial steps and methods that a computer processes when an application is received for a life insurance policy with benefits linked to a specific need and receives data linked with the insured's need for life insurance. The process starts with the system receiving the application in step 1. The system scans the application in step 2. The system reviews the application in step 3 to determine the type of benefit category. If the benefit is tied to the insured's income, the system proceeds to step 4. If the benefit is tied to the insured's retirement account balance, the system proceeds to step 5. If the benefit is tied to the insured's estimated federal estate tax for the forthcoming calendar year, the system proceeds to step 6. If the benefit is tied to the value of a business, the system moves to step 7. If the benefit is tied to the accumulated losses in a linked investment account, the system moves to step 8.

In some embodiments, steps 4 through 8 represent the gateway to the rules, methods, processes, and formulas that would be applied in that category of insurance. Each step aligns with the policy form or legal contract the insured would have with the insurance company on how the death benefits would be redetermined periodically and other elements of the contract. It can be appreciated there may be other life insurance needs that applicable to embodiments disclosed herein but have not specifically been identified herein.

Once the benefit category has been determined the system moves to step 9 to determine if the initial (baseline) data has been submitted with the application, or if the system has the information, the authorization, and the means to obtain the data from the administrator. If the data has been received with the application, or the data can be obtained directly from the administrator before the policy completes the application process, the system can calibrate the requested benefit determination factors to the requested face amount on the application. If the answer to step 9 is 'yes', the system moves to step 10 and instructs the system to go to FIG. 2 for onboarding the application. If the answer is 'no' in step 9, the system records that the recalibration will need to be deferred (step 11) and instructs the system to proceed to FIG. 3.

FIG. 2 is a process chart for onboarding a new application with the initial benefit data submitted or obtained by the system directly from the administrator holding the insured's data related to the need for life insurance. The process starts in step 12 with the receipt of the application. The system moves to step 13 to retrieve the initial benefit driven data from the applicant's file uploaded or directly from the administrator. Step 14 involves computing the preliminary face amount that would be calculated using the data and the insured's requested factor and comparing the requested face amount to the data-based calculated face amount. This process assumes that the application would be underwritten for the requested face amount and the benefit determination factors would be restated to align the face amount with the data.

For example, if the benefit category is life insurance adjusting to one's income, the insured would request an "income multiple". If the requested income multiple is 5.0 along with a face amount of $300,000, and the insured reports annual earned income of $50,000 then the income multiple would be recalibrated to be 6.0 ($300,000/50,000). If the category is life insurance to pay the estimated income tax on a tax qualified retirement account, the insured would request both a tax rate and the percentage of the account to insure. Suppose an insured with a $100,000 IRA account requested 100% of the account be covered for a 35% tax rate, the calculated benefit would be $35,000 ($100,000× 100%×35%). Conversely, if the insured requested $30,000 of benefits and the initial retirement account value was $100,000, the system would calibrate the percentage of the account insured to be 85.71% ($30,000/[100,000×35%]).

Step 15 compares the computed face amount to the requested face amount. If the computed face amount exceeds the amount requested, the system moves to step 16 to adjust the benefit determination factors. If the computed face amount is less than the requested face amount, the benefit determination factors remain as requested and confirmed in step 17. The system moves to step 18 to review the information available on the insured to perform the underwriting. In step 19, the system determines if more information is needed for the underwriting. This decision process is determined by the amount of face amount requested, the age of the insured, and/or concerns raised by the information already obtained. If the answer to step 19 is 'yes', the system moves to step 20 to execute algorithms to retrieve external data on the insured (e.g., driving records, prescription drug history, credit reports). If the answer to step 19 is 'no', the system moves directly to step 21 to determine the proposed insured's underwriting class.

After the underwriting class decision in step 21, the system stores the decision in the customer file (step 22) and moves to step 23 to determine if the insurance company will issue the life insurance coverage. If the application is rejected, the system moves to step 24 to notify the application, the reasons for the rejection (where appropriate), and any potential alternatives. If the decision in step 23 is 'yes', the system moves to step 25 to calculate the annual premium for the insured's initial face amount and underwriting class:

Face Amount($T$)=insurance benefit applied for in the application

Premium Per Unit($X;S;T$)=Base Mortality Table($X;S;T$)*Underwriting Factor($C$)

Premium($T$)=[Premium Per Unit($X;S;C$)*Face Amount($T$)]+Administration Fee

T=policy year
X=age of the insured
S=sex of the insured
C=underwriting class based on insured's health and risk factors The system next moves to step 26 to compute the lifetime maximum benefit that can be earned without underwriting for the benefit category requested. See FIG. 7 for an expanded version of the process to determine the lifetime cap. The system then moves to step 27 to notify the policy owner of the premium due. This is communicated to the policy owner in item 28. The policy owner may submit a check to the insurance company's premium collection department (step 29) which notifies the system to send the life insurance contract to the policy owner in step 30. If the policy owner (item 28) wishes to pay the premium electronically, they access their online account in step 31. In step 29 and step 31 the system updates the customer file once payment has been received. This completes the process for FIG. 2.

FIG. 3 outlines the system and methods for onboarding a new application without the initial baseline data underlying the policy's automatic benefit calculation. The process in FIG. 3 is like FIG. 2 except the system defers confirming the requested benefit determination factors until the data is received by the policy owner or accessed directly from the third-party administrator. The system starts the process with step 32 by receiving a life insurance application. The system then moves to step 33 to store the requested benefit determination factors for future validation or adjustment. For the income-linked benefit category the benefit determination factor is the 'income multiple'. For the benefit category linked to the insured's retirement account(s), the benefit determination factor is the percentage of the account insured (up to 100%). The system then proceeds to process steps 34 through 48 which are identical to steps 18 through 31 in FIG. 2. These steps represent the process to underwrite the requested face amount, determine the underwriting class, set the lifetime cap, compute the premium, collect the premium, send out the policy once payment is received, and update the customer file.

FIG. 4 represents the methods and system for handling the first automatic benefit calculation for policies processed through FIG. 3 because the benefit determination factors could not be calibrated during the application process. The rebalance cycle starts with step 49 where the system recognizes a policy is within the first period (typically a year) and the benefit determination factors must be recalibrated. In step 50 the system determines whether it is a policy's annual rebalance date. If not, the system moves to step 51 to terminate the cycle. If it is a rebalance date, the system moves to step 52 to retrieve the benefit driven data and the policy's initial face amount from the customer file in box 60. This process assumes the customer file has received the required data from the administrator (box 62). The administrator may send the information to the policy owner (e.g., a W2 form for income data or an account statement for a retirement account) in step 63. The customer then uploads a copy of the statement to their online account (box 64). Alternatively, the system may retrieve the data directly from the administrator in step 65.

The system moves to step 53 to compute the preliminary new face amount using the initial benefit driven data and the benefit determination factors and compares the preliminary face amount to the policy's initial face amount. If the preliminary face amount is less than the initially underwritten face amount, the system moves to step 54 to calculate the face amount for the forthcoming period using the current period data. If the preliminary face amount in step 53 exceeds the initial face amount, the system moves to step 55 to revise the benefit determination factors. The face amount is recalculated in step 56 using the revised factors. Upon completion of step 54 or 56, the system moves to step 57 to compute the new premium. The insured is notified of the new face amount and new premium in step 58 when the customer file is updated (box 60). When the policy owner receives the premium notice, they submit a check to the premium collection department (box 61) or go online to their customer account to pay the premium electronically (box 64).

Once the policy is in-force and past the initial process of calibrating the benefit determination factors to the initial data and face amount underwritten (whether it is during the application process as described in FIG. 2 or during the first rebalance cycle as described in FIG. 4), the system implements the ongoing rebalance cycle to update the benefits according to the insured's benefit data relevant to the specific insurance need. FIG. 5A describes the process for income-linked benefit category listed in FIG. 1.

The cycle process in FIG. 5A starts with step 66. The system moves to step 67 to determine if the cycle date aligns with the policy's rebalance date (typically once a year). If the answer is 'no' in step 67 the system moves to step 68 to terminate the cycle and move to the next policy. If the answer to step 67 is 'yes', the system moves to step 69 to retrieve the policy owner's benefit data and the current benefit determination factors from the customer file in box 79.

The customer file may receive benefit data from the administrator via multiple methods, two of which are described in FIG. 5A. First, the system may obtain the data directly from the administrator (step 84) or third-party source that holds the data. For example, the administrator represented by box 81 could be an employer, the Internal Revenue Service, or a service provider such as a tax preparation service. Alternatively, one of those entities may provide the information to the policy owner (e.g., employers are required to send IRS W2 forms annually to their employees). The policy owner (item 78) could upload a copy of the statement with the required data to their online account (item 83) which the system reads to update the customer file in box 79.

Once the customer data file has been updated in step 69, the system moves to step 70 to process a comparison test between the preliminary face amount based on the current income data and income multiple versus the current face amount. Processing such a test requires using earned income from the prior period (e.g., the new data representing the last calendar year) as shown in the following formula:

Preliminary Face Amount($T$)=W2($T-1$)*Income Multiple($T-1$)

W2($T-1$)=reported W2income for the insured for year $T-1$(prior calendar year);

T=policy year for which the new face amount is being determined
Income Multiple(T−1)=factor to determine insurance benefit If the preliminary face amount from step 70 is less than the current face amount, the system moves to step 71 to set the new face amount equal to the current face amount. This is a protective feature unique to the income-linked benefit category, preventing a decrease in life insurance from lower income due health reasons or other factors not correlated with a reduction in insurance need. If the preliminary face amount from step 70 is more than the current face amount, the system moves to step 72 for another comparison test: does the preliminary face amount exceed the maximum amount allowed in the policy without more underwriting? If the answer to the comparison test in step 72 is 'yes', the system moves to step 73 to set the face amount for the next period to the maximum allowed. If the answer to the comparison test in step 72 is 'no', the system moves to step 74 to calculate the new face amount based on the insured's reported income and the income multiple.

Once the system determines the new face amount either from steps 71, 73 or 74 the system moves to step 75 to compute the new premium for the insured's current age, underwriting class and face amount. The updated annual statement is sent to the customer in step 76 while notifying the customer of the new benefit amount and premium in step 77. This information is transferred to the customer file in box 79. The policy owner (item 78) submits the premium check to the premium collection department (box 80) which notifies the customer file (box 79) when received, or the customer pays the premium electronically via their online account (item 83).

FIG. 5B is a similar process as FIG. 5A except it is applied to a retirement income tax benefit category (e.g., item 4 in FIG. 1). Steps 85 through 88 in FIG. 5B are identical to steps 66 through 69 in FIG. 5A. The difference in FIG. 5B starts with step 89: how the benefit determination data and factors are uniquely applied to the retirement income tax benefit category. In this case, the benefit could increase or decrease as the value of the retirement account increases or decreases. This category process does not need the floor (e.g., the benefit cannot decrease in FIG. 5A's step 71). In FIG. 5B, the system calculates the preliminary face amount in step 89, determines if the preliminary face amount exceeds the lifetime maximum in step 90, and moves to step 91 to set the new face amount to be the maximum when step 90 answer is 'yes'). If the answer to step 90 is 'no', the system sets the new face amount to be the calculation from step 89. From that point forward, steps 93 through 102 in FIG. 5B are identical to steps 75 through 84 in FIG. 5A.

FIG. 6 describes the major system processes for handling voluntary change requests for a policy that is not the automatic benefit change linked to data. The process starts with step 103 where the system receives a change request. If the policy owner wants to increase the face amount, the system moves to step 104. For policies with automatic data-linked benefits, the face amount increase desired must be translated into a new benefit determination factor. In step 105 the system accesses the customer file (box 125) to retrieve the current benefit determination factor. In step 106 the system computes the new benefit determination factor based on the requested new face amount of insurance. For the income-based category of insurance, the new income multiple would be as follows:

$$\text{Income Multiple(new)} = \frac{\text{Face Amount}(T)}{W2(T)}$$

Face Amount($T$) = Requested Face Amount during year $T$ $W2(T)$ = Insured's income reported for current period (e.g., the prior calendar year)

Step 107 calculates the increase in risk that must be underwritten. Step 108 reviews the information available for the underwriting and moves to step 109 to determine if more information is needed. If 'yes', the system moves to step 110 to retrieve the external data. If 'no', the system by-passes step 100 and moves directly to step 111 to make an underwriting class decision. In step 112 the system determines whether the insurance company will accept the requested increase in face amount. If 'no', the system moves to step 113 to notify the policy owner of the rejection. If 'yes', the system moves to step 114 to determine if the underwriting class decision is more favorable than the underwriting class assigned to the policy owner's existing coverage. If the answer is 'no', the system moves to step 115 to add the new face amount to the existing coverage, update the customer's file for the new benefit determination factor calculated in step 106, and move to step 116 to set the lifetime maximum for the new benefit segment. Step 116 is more fully described in FIG. 7. The system then moves to step 117 to compute the premium for the additional coverage and notify the policy owner of the changes in step 118 (e.g., approval of the face amount increase, the new premium, the new benefit determination factor, and the lifetime cap on the new segment of coverage).

Going back to step 114, if the underwriting class is more favorable (e.g., the insured's health has improved since the last underwriting), the system processes step 119 to update the underwriting class for the existing insurance. The premium for new and existing coverage is computed in step 120. The lifetime cap is reset in step 121 using the processes and methods described in FIG. 7. Upon completion of step 121, the system notifies the policy owner (item 123) of the changes in step 122. The policy owner pays the premium to the premium collection department in step 124 which updates the customer file once received. Alternatively, the policy owner pays the premium electronically (not described in FIG. 6 but consistent with step 101 in FIG. 5B).

The policy owner may also request to voluntarily reduce the face amount as referenced in step 126. Step 127 is conditional upon the specific benefit category whether a minimum face amount needs reset. In the case of the income-linked benefit category, a minimum face amount should be administered to prevent a decrease in face amount due to lower income reported. In the case of retirement account income tax-based coverage, a minimum face amount feature is not necessary to protect against unintended consequences. The face amount increasing or decreasing with the account value aligns with the consumer need.

In step 128 the system recomputes the benefit determination factor based on the requested decrease in face amount. For the income-based benefit category, this is a recalculation of the income multiple.

$$\text{Revised Income Multiple}(T) = \text{Requested Face Amount}(T)/\text{Reported W2Income}(T-1)$$

T=the policy year of the requested change
Reported W2 Income(T−1)=prior calendar year earned income For the retirement account coverage, this is a recalculation of the percentage of the account insured. A face amount reduction may result in a premium refund which is computed in step 129. The formula expressing this calculation follows:

$$\text{New Premium}(T) = \frac{\text{Requested Face Amount}(T) * \text{Premium}(T)}{\text{Face Amount}(T)}$$

$$\text{Premium Refund}(T) = \frac{\text{days until end of current cycle} * (\text{Premium}(T) - \text{New Premium}(T))}{(\text{total number of days in the period})}$$

The premium refund is distributed to the policy owner in step 130. The customer file (item 125) is updated for the changes to their life insurance policy.

A customer may also request to change the beneficiary (step 103). The customer file (box 125) is updated by the system in step 131.

FIG. 7 describes the methods and system for determining the lifetime maximum on the life insurance benefit due to the data linked to the insured's insurance need. The overall steps are described in FIG. 7. The specific factors or formulas may be different by the benefit category. For example, an insurance carrier may be more comfortable with a higher increase in coverage without underwriting when the data is linked to income rather than the retirement account balance. Rising income may be more positively correlated with good health whereas an increasing retirement account balance may have little correlation to the insured's health.

The process starts in FIG. 7 with step 132 where new insurance has been approved by underwriting. The new coverage could be a new policy application or an increase in coverage on an existing policy. The policy owner status is accessed in step 133. The system moves to step 134 to retrieve the customer profile and face amount approved from the customer file (box 135). The process moves to step 136 to determine a preliminary lifetime cap. The system moves to step 137 to review available macro data from box 138 and analyze trends in the data to help confirm or change the preliminary lifetime cap. In step 139 the system makes a final decision on the new policy's lifetime cap and updates the data files (box 141) in step 140.

If step 133 determines the new insurance is an increase on an existing policy, the system moves to step 142 to retrieve the customer profile and total face amount exposure on the insured from box 135. In step 143 the system accesses the customer's historical file to determine the existing coverage and calculate the increase. The system moves to step 144 to determine a preliminary lifetime cap for the new segment of insurance like step 135 except the process incorporates information on the existing exposure. For example, the lifetime maximum for an increase in coverage may be different for a policy owner that is already capped out on the existing coverage vs. a customer with substantial room for more automatic increases in benefits on the existing insurance.

In step 145 the system pulls historical data on the insured from box 141 and analyzes trends and other factors that may be pertinent to setting the lifetime cap on the new segment. For existing policies with the same insurance company there will be data on the insured's underwriting class over time. A positive trend may indicate improving health and justify a higher cap without more underwriting in the future. The system moves to step 146 to pull macro data and trends from box 138 to determine the lifetime cap. The first step is determining the total lifetime cap for all benefit segments of the policy (step 147). The system then moves to step 148 to finalize the lifetime cap on the new segment and/or revises upward the lifetime cap on an existing segment. Upon completion, the system moves to step 140 to notify all parties and update the customer file (step 141).

FIG. 8 describes the method and computer processes to handle a policy termination. Life insurance policies terminate from one of three scenarios: the insured dies, the policy owner wants to terminate the coverage (possibly triggering a premium refund, or the policy owner fails to make a premium payment (generally known as a policy lapse). While these procedures are standard industry practice, they are provided herein this application for sake of policy benefit administrative completeness.

The process begins in step 149 with the system receiving notice of termination procedure to begin from one of the three sources. In step 150, the system activates the process because a missed premium payment triggers a lapse. The system initiates step 151A to retrieve the premium due from the customer file (item 152), sends a policy lapse notice to the policy owner along with the grace period to re-activate the policy without underwriting. The system processes step 151B during the grace period to determine if the premium was received. If the answer is 'yes', step 151C is activated to halt the termination process and update the customer file in box 152. If step 151B reaches the end of the grace period and the premium has not been received, the system moves to step 151D to send final policy termination notice to the policy owner and update the customer file in box 152.

FIG. 8 continues with notification by the policy owner in step 153 to voluntarily cancel the policy. The system moves to step 154A to retrieve information on the policy from the customer file (item 152) and moves to step 154B to calculate the pro-rata premium refund.

$$\text{Premium Refund} = \frac{\text{days until end of current cycle} * (\text{Premium})}{(\text{total number of days in the period})}$$

After the calculations in step 154B, the system moves to step 154C to send the unearned premium refund to the policy owner. The cancellation process is completed when the customer file (item 152) is updated.

FIG. 8 continues with notification of the insured's death in step 155. The system moves to steps 156 and 157 to retrieve the beneficiary information and current face amount of the policy, respectively, from the customer file (item 152). The system submits the death claim benefit to the beneficiary in step 158 and updates the customer file (item 152).

FIG. 9 is a schematic of the technology infrastructure needed to support the embodiments disclosed herein. It will be appreciated that each step and/or method may be implemented with a computer or computer-based network. A computer represented by box 162 may be specifically programmed to carry out the steps described above/below, and store information related thereto. For example, a computer may be used to store data related to the policy including data about the policy owner, beneficiary, death benefit and premium for a specified coverage period. Further, a computer may be used to assist with the calculations and analysis in FIG. 2 (steps 14, 15, 25, and 26), FIG. 3 (steps 41 and 42), FIG. 4 (steps 53, 54, 56, and 57), FIG. 5A (steps 70 through 75), FIG. 5B (steps 89 through 92), FIG. 6 (steps 106, 107, 128, 129, 116, 117, 120), FIG. 7 (steps 136, 137, 143 through 148), FIG. 8 (step 154B) and method 1700 of FIG. 17.

Thus, embodiments within the scope of the embodiments disclosed herein include program products comprising computer-readable media for carrying or having computer executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical storage, magnetic disk storage or other magnetic storage devices, cloud-based storage, or any other medium which can be used to carry or store desired program code in the form of computer-executable instructions or data structures, and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general-purpose computer, special purpose computer, or special purpose processing device to perform a certain function or group of functions.

In addition to a system, embodiments disclosed herein are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Embodiments disclosed herein may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like.

Embodiments disclosed herein may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments disclosed herein might include a general-purpose computing device in the form of a conventional computer, including a processing unit, a system memory, and a system bus that couples various system components including the system memory to the processing unit. The system memory may include read only memory (ROM) and random-access memory (RAM). The computer may also include flash memory devices that store data non-mechanically, a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and Web implementations of the embodiments disclosed herein could be accomplished with standard programming techniques with rule-based logic and other logic to accomplish the various database searching steps, correlation steps, comparison steps and decision steps. It should also be noted that the words "component" or "module" as used herein is intended to encompass implementations using one or more lines of software code, and/or hardware implementations, and/or equipment for receiving manual inputs.

FIG. 9 illustrates the components of a general-purpose computing system connected to a general-purpose electronic network (item 159), such as a computer network. The computer network can be a virtual private network or a public network, such as the Internet. As shown in FIG. 9, the computer system (item 163) includes a central processing unit (CPU) (box 162) connected to a system memory (item 164). The system memory (item 164) typically contains an operating system (item 163), a BIOS driver (item 166), and application programs (item 165). In addition, the computer system (item 160) contains input devices (item 167) such as a mouse or a keyboard (item 171), and output devices such as a printer (item 170) and a display monitor (item 169), and a permanent data store, such as a database (item 170B). The computer system generally includes a communications interface (item 168) to communicate to the electronic network (item 159). Other computer systems (items 161) also connect to the electronic network (item 159) which can be implemented as a Wide Area Network (WAN) or as an internetwork, such as the Internet. Data are stored either in many local repositories and synchronized with a central warehouse optimized for queries and reporting or are stored centrally in a dual use database. This system is one example of a system that could execute the method steps set forth herein.

FIGS. 10 through 16 provide examples to illustrate the processes and procedures disclosed herein. FIGS. 10 through 13 compare the methods for two automatic benefit categories of life insurance (income-based, item 3 in FIG. 1, and retirement account-based, item 4 in FIG. 1) for the two data submission paths in FIG. 1 (item 10, baseline data is submitted with the application, and item 11, baseline data is submitted after the initial application but before the first rebalance date). FIGS. 14 through 16 expand on the income-based category with scenarios involving a decrease in earned income, a voluntary reduction in face amount, and a voluntary increase in face amount with a different underwriting class.

FIG. 10 illustrates the methods and procedures for an income-based policy where the initial benefit data was not received with the application (item 121). Item 122 shows the face amount requested on the policy application. Item 123 is the applicant's requested income multiple (e.g., the death benefit will be reset annually to five times the amount of the insured's earned income). Item 124 is the assigned underwriting rating (representing a 30% load on the base pricing rates). Item 125 is the lifetime cap set by the insurance company for this policy after the system executes the steps in FIG. 7.

During the first year of this policy, the face amount of coverage is the amount applied and approved (item 122). During this period, the policy owner provided their earned income data for the prior calendar year, shown as item 126. Given the income in item 126 ($50,000), multiplied by the requested income multiple of five (item 123), the initial calculated benefit is $250,000 (item 127). The calculated benefit is compared to the coverage underwritten and approved (item 122, $300,000). Since the amount of coverage approved exceeds the calculated benefit amount of $250,000 the policy's income multiple (a.k.a., benefit determination factor) of 5.0 remains unchanged (item 128).

The bottom chart on FIG. 10 shows the year-by-year data for many columns of information to administer the calculation of the benefits and premium each policy year, starting with column 129, the insured's earned income. As the insured's income increases over time, the benefit is reset to maintain the desired multiple of the insured's income, subject to constraints such as the lifetime cap and a guaranteed floor. Item 130 shows each year's income multiple of 5.0, no change since requested (item 123) and validated by the initial income data (item 128). Column 131 shows each year's preliminary face amount as the multiplication of the income in column 129 and the income multiple in column 130.

Moving across the chart, column 132 records any voluntary changes requested in the face amount. Voluntary increases will be subject to underwriting while decreases are processed automatically. The example in FIG. 10 does not have any voluntary changes; this will be illustrated in FIGS. 15 and 16. Column 133 would record the adjusted income multiple. Column 132 is empty in FIG. 10 since there are no voluntary changes in coverage in this example.

Item 134 highlights the guaranteed floor staying level for the first four years in this example because the face amount underwritten and approved (item 122) was greater than the preliminary calculated face amount in column 131. This is a protective feature unique to the income-linked category as identified in FIG. 5A's steps 70 and 71 to ensure the policy owner's face amount would not decrease due to the lower earned income. In FIG. 10 example, the insured's calculated benefit was less than the initial face amount (which sets the guaranteed floor as shown in item 134). In year 5, shown by item 138, the submitted earned income and the income multiple produce a benefit greater than the guaranteed floor. The increase in benefit becomes the new guaranteed floor as shown by item 138B.

The lifetime cap is calculated at issue (item 125). The cap extends to all future years for the coverage underwritten as shown in column 135. Column 136 shows the insurance benefit for each policy year. Each year's new benefit is the greater of the guaranteed floor (item 134 and 138B, for example) and the preliminary calculated coverage in column 131. As shown by item 137 in this example, the policy owner's coverage remains flat for the early years of the policy until the insured's earned income and income multiple justify raising the insurance benefit.

Items 139 through 143 refer to the components that produce the recalculation of the insurance premium each year. The process starts with column 139 which illustrates a base premium rate table that an insurance company produces by age for a broad underwriting class such as gender and smoking status. Item 140 represents the load to cover expenses, profits, and the insured's mortality risk assessed during underwriting. In this example, the net premium rate (item 141) is 130% of the base mortality rate from column 139. Column 142 is the final insurance benefit for each year after the calculated benefit is adjusted for floors (item 134) and caps (item 135). Item 143 is the annual premium in this example for the first year of the policy (item 142 multiplied by item 141). For simplicity, this example did not reflect administrative policy fees or other charges that factor into the final premium.

FIG. 11 is another income-linked benefit example except the initial baseline income data is submitted with the application (item 144) or otherwise obtained by the system electronically from the administrator holding the required data (such as the employer or the IRS). The face amount of the application (item 145) is the same as the example in FIG. 10, but the initial income (item 146) is lower at $40,000 than the assumption in FIG. 10 example. As a result, the policy's benefit determination factor is 7.5 (item 147) vs. an income factor of 5.0 used in FIG. 10. The other initial variables are presumed to be the same as FIG. 10 (class 1 risk assignment, item 148, lifetime cap of $750,000, item 149, and the 30% premium load, item 150). Similarly, the annual premium rate (item 151) is the same as item 141 in FIG. 10. Given the face amount is the same as FIG. 10, the first-year premium (item 152) is also the same as item 143 in FIG. 10.

In the FIG. 11 example, the insurance company approved a $300,000 policy for an individual earning $40,000 a year, effectively approving future benefits to be calculated using a higher income multiple (7.5; item 154). In year 2 the income increased to $42,000 which results in a preliminary benefit of $315,000 (item 155) ($42,000×7.5). Since the second year's preliminary benefit exceeds the guaranteed floor (item 156), the final insurance benefit (item 158) is set to the preliminary benefit (item 155). This process is described in FIG. 5A, steps 72 and 74. The lifetime insurance cap remains at the level set at issue (column 157).

FIG. 12 example is like FIG. 10 except the benefit category the retirement account income tax upon the insured's death. Item 160 identifies this as a policy processed through the application queue without knowing the initial benefit-linked data on the insured's retirement account. In other words, the insurance company knows the insured wants a policy to mirror a certain percentage of his/her retirement account (i.e., the tax rate requested in the application) but the insurance company does not know the current amount of that retirement account. To proceed, the applicant requests a certain face amount of life insurance ($40,000 in FIG. 12; item 161). The applicant also requests what percentage of the account they wish to cover the estimated taxes (item 162; set at 100% in this example since policy owners buying this coverage would likely seek to cover all the taxes).

The applicant specifies the assumed tax rate (30% in this example, item 163) that his/her beneficiary(ies) will pay upon inheriting the retirement account. Since state and federal tax rates change periodically, and beneficiaries state of residence change over time, it would be impossible for a policy's benefits to exactly match the taxes payable upon the insured's death when the retirement asset is inherited. The methods and system of the invention accommodate the ability to estimate the overall tax rate and change the assumed tax rate over time through the voluntary change process described in FIG. 6. There are no barriers to requesting a decrease in the tax rate (which decreases the benefit); increasing the policy's tax rate is the same as a voluntary increase in requested benefit and will be subject to underwriting.

The insurance carrier will set a lifetime cap for the policy face amount being requested (item 164). The lifetime cap determination process is described in FIG. 7. Note that item 135 in FIG. 7 references the customer profile as a key input in determining the lifetime cap for an application. The customer data profile may or may not hold information on the initial account value (e.g., the result of item 160). The system and method allow the insurance company to be more conservative (e.g., lower) with the lifetime cap (item 164) on applications without the initial data to prevent anti-selection. Alternatively, the system and method could withhold the lifetime cap determination until the initial data is received.

Continuing with the example in FIG. 12, the application is processed and approved with a class 1 assignment (item 165) and computes the first-year premium (item 166) based on the $40,000 face amount requested and the premium unit rate for a class 1 rating. Prior to recalculating the benefits on the first rebalance date, the insurance company obtains the initial baseline retirement account value (item 167) either through an account statement upload or electronic feed directly from the administrator (steps 99 through 102 in FIG. 5B). The first-year benefit is calculated to be $39,000 (item 168) based on the initial account value (item 137) and the requested tax rate (item 163) ($130,000×30%=$39,000). Since the calculated face amount (item 168) is less than the face amount already underwritten and approved by the insurance company (item 161), the percentage of the account remains at 100% (item 169). If the value of item 168 was greater than the approved face amount, the percentage of the account insured would be adjusted down to align with the approved face amount (this process is referred to as calibrating the benefit determination factor). In the retirement account benefit category, the benefit determination factors are the tax rate and the percentage of the account insured.

The example in FIG. 12 continues with the account value data submitted for the second policy year (item 170). The preliminary face amount is calculated (item 172) as the product of the account value ($136,500; item 170), the tax rate (30%; item 163), and the percentage of the account insured (100%; item 171). Item 176 references the new annual premium based on the new insurance benefit ($40,950) and the insured's premium unit rate for that age, policy duration, and assigned underwriting class (item 165).

The guaranteed floor (item 173) is not applicable in this example since the retirement account benefit category allows the benefit to be adjusted up or down. In practice, there may be a minimum face amount required by the insurance company for administrative cost reasons, but this minimum floor isn't applied for reasons unique to the benefit category. Column 174 illustrates the lifetime cap staying the same in all years. Column 175 illustrates the insurance benefit increasing annually as the policy owner's retirement account value rises.

FIG. 13 is another retirement account income tax example like FIG. 12 except the initial application process obtains the initial baseline data (item 177) and the insured does not request enough life insurance face amount for the tax rate requested and the amount of the retirement account insured. In practice, the application process will confirm if the insured seeks to insure less than 100% of the account, which is the assumption in this example.

In FIG. 13 the application is $50,000 of face amount (item 178), 100% of the account (item 179), 30% tax rate (item 181) and data verifying an initial retirement account value of $200,000 (item 180) as of the qualifying date (e.g., prior calendar year-end values). Data on items such as retirement accounts are changing daily; the system and method accommodates a standardized protocol for gathering data on accounts that will be used to automatically determine the life insurance benefits. Given the initial account value and the benefit determination factors, the initial calculated face amount of $60,000 ($200,000×100%×30%) exceeds the requested face amount of $50,000. Accordingly, the percentage of account insured is adjusted down to 83.33% (item 183; $50,000/($60,000)].

Since the initial account value is known (item 177 is 'yes'), the FIG. 7 process to determine the lifetime cap may produce a relatively higher cap (item 185) such as $150,000 than the amount illustrated in FIG. 12 ($120,000; item 164 in FIG. 12). The first-year premium (item 186) is determined from the $50,000 face amount requested on the application and the premium unit rate for the assigned underwriting class (item 184).

The example in FIG. 13 continues with the retirement account value increasing to $210,000 in the second year (item 187). The preliminary calculated benefit is $52,500 (item 189) ($210,000×30%×83.33% in column 188). The next year's premium is calculated on the new benefit ($52,500) and the updated premium unit rates (item 190).

FIG. 14 illustrates the method and system for an income-based benefit category where the insured's earned income drops to zero. Items 192 through 197 provide the data for the scenario. The policy owner applies for $300,000 of face amount (item 193) without the initial baseline data (item 192 is 'no') and seeks five times their income (item 194). Before the first rebalance cycle, it is determined the initial baseline income is $100,000 (item 195), producing a face amount of $500,000 (item 196; 5.0×$100,000), which is well above the $300,000 approved in underwriting. As a result, the income multiple is revised to 3.0 (item 197; $300,000/$100,000).

From this point forward the life insurance benefit is based on the insured's income (e.g., item 199) and the 3.0 income multiple (item 198), producing a benefit of $315,000 in year two (item 200). The process is repeated annually with benefit resetting higher with the growth in income. By year seven, the insurance benefit has risen to $402,029 (item 202). This benefit resets the guaranteed floor (item 203). Something happens in the insured's life, and he/she does not earn any income in the $8^{th}$ and $9^{th}$ year. The loss of income could be health related or personal decisions not to work that are not related to health. Item 201 highlights the dramatic change in the insured's income. As a result, the preliminary face amount calculated in item 201B is zero. Due to the guaranteed floor in item 203, the final insurance benefit in item 202B is set to the guaranteed floor. The example further assumes the insured resumes working in year 10 but at an income level substantially lower than the income earned previously. The system continues to apply the methods and calculations, but the insurance benefit will remain at the guaranteed floor level until the insured's income exceeds its prior highs.

FIG. 15 is another income-based example designed to illustrate the system and method handling a policy owner voluntarily requesting a lower face amount. The example starts with the assumption the income multiple is 5.0 (item 204) for the first seven years of the policy. By the $7^{th}$ year the income has risen to $80,406 (item 207), producing an insurance benefit of $402,029 (item 205). The insured decides to reduce their life insurance benefit down to $150,000 (item 206). As a result, the system recalculates the income multiple benefit determination factor to be 1.87 (item 208; $150,000/$80,406). In addition, a voluntary reduction in requested face amount will reset the guaranteed floor lower to the amount requested (item 209). In year 8, the insured reports income of $84,426 (item 210A) which results in a preliminary calculated benefit of $157,500 (item 210) based on the new income multiple factor (item 210B).

FIG. 16 is a more complicated example of administrative activity. FIG. 16 illustrates the system and method for handling a policy that requests more face amount of insurance on an existing policy (e.g., an increase in the income multiple factor). Furthermore, the underwriting on the requested increase in coverage is assigned a different underwriting class (item 215) which has a higher risk load factor (item 217). Item 211 identifies the income multiple on the initial segment of insurance. By year seven the preliminary benefit has increased to $497,750. The example assumes the policy owner now requests the income multiple to be increased to 5.0 (item 213). If approved by underwriting, the face amount would increase to $829,583 (item 214). This represents a new segment of insurance (identified by box 216) with an initial face amount of $331,833 (item 219). The initial premium unit rate is item 218, resulting in a total premium of $2,690 (item 221), the sum of the premium for the initial segment of insurance (now $497,750) and the new segment ($331,833).

The face amount for each benefit segment is based on the insured's total income but each segment has its own income multiple benefit determination factor items 223 and 224) and lifetime cap (item 220 for segment two). The process to determine the lifetime cap in FIG. 7 allows for the cap determination process to consider data that may be relevant on an in-force policy that may not exist for a new policy. In this example, the insured's health has worsened since the original underwriting which may impact the lifetime cap for the new benefit segment.

The bottom of the chart in FIG. 16 highlights a potential consequence of the lifetime cap determination process when multiple segments are active on the same policy. At age 59 the insured's calculated coverage is $1,342,403 (item 226) is less than the total of the two segment's lifetime caps ($1,400,000; item 222). However, the initial segment of insurance is based on 3.0 times income and a $750,000 lifetime cap while the new segment has an income multiple of 2.0 and a $650,000 lifetime cap. Due to the insured's income growth, the initial benefit segment is capped out by age 58. As a result of this lifetime cap, the insured's total benefit at age 59 (item 227) is less than the preliminary benefit calculated in item 226, even though item 226 is less than the aggregate cap. Those skilled in the art of insurance product design and risk management will appreciate that the lifetime cap determination process could recognize this anomaly and override the initial segment's cap (effectively borrowing from capacity available under the cap in segment two). The system and method allow for the process in FIG. 7 to evaluate the situation and determine if post-issue increases in lifetime cap for any benefit segment are warranted.

Turning ahead in the drawings, FIG. 17 illustrates a flow chart for a method 1700, according to an embodiment. Method 1700 is merely exemplary and is not limited to the embodiments presented herein. Method 1700 can be employed in many different embodiments or examples not specifically depicted or described herein. In some embodiments, the activities of method 1700 can be performed in the order presented. In other embodiments, the activities of method 1700 can be performed in any suitable order. In still other embodiments, one or more of the activities of method 1700 can be combined or skipped. In many embodiments, the system of FIG. 9 can be suitable to perform method 1700 and/or one or more of the activities of method 1700. In these or other embodiments, one or more of the activities of method 1700 can be implemented as one or more computer instructions configured to run at one or more processing modules and configured to be stored at one or more non-transitory memory storage modules. Such non-transitory memory storage modules can be part of a computer system such the computer system of FIG. 9. The processing module(s) can be similar or identical to the processing module(s) described above with respect to computer system in FIG. 9.

In many embodiments, method 1700 can comprise an activity 1710 of combining a life insurance policy from an insurance company with independent data specific to an insured individual to form a dynamic death benefit life insurance policy. The independent data specific to the insured individual comprises at least one of: data representing an annual earned income, data representing a value of a tax-qualified individual retirement account. Furthermore, the specific data itself used to determine the insured's death benefit is unique to the insured and source of the data is external to the life insurance policy itself. The data must be retrieved by a computer network or some other means to periodically recompute the death benefit. One example is data representing the annual earned income reported to the IRS for income tax purposes. The insurance need is protecting the insured's earned income. As the insured's income increases, the amount of life insurance coverage that needs to be protected is likely to increase. The specific data obtained to compute the benefit is the insured's own income reported to the IRS. Another example is data representing the value of a tax-qualified individual retirement account, 401K account, or any tax qualified or retirement account, or retirement funding instrument such as an annuity. The insurance need is a death benefit that approximates the income tax liability passed to the account's beneficiary upon the insured's death, adjusting up or down with the taxable value of the account. The insured owns the retirement account or annuity, and it is the insured's death that triggers the tax liability. The specific data obtained to compute the benefit is the insured's retirement account(s) and/or annuity. Another example is the market valuation of a small business held by multiple owners/partners. The insurance need is a death benefit that adjusts up or down to the periodic revaluation of the business. Each partner would own life insurance on the other partners in a buy/sell arrangement. The amount of life insurance benefit would provide the funds to buy out the deceased's ownership for the recent fair market valuation of their ownership. The independent data is the periodic valuation of the business by an independent party.

In some embodiments, the data is independent of the life insurance policy itself. The data used to determine the policy's death benefit is obtained by administrators or other sources external to the life insurance policy being administered. In the example of life insurance benefits linked to the insured's income, the data would be the W2 form filed with the IRS or schedule C of their tax return (if the insured has self-employed income to report on their taxes). In the example of a life insurance death benefit designed to approximate the income tax triggered upon the death of the insured's tax qualified individual retirement account or 401K, the data would be sourced from the administrator of the retirement accounts. In the case of an annuity, the data would be sourced from the insurance company's administrator. Another test of the independence between the data determining the death benefit and the life insurance policy is the freedom the insured maintains with respect to the activity related to the data. When life insurance coverage is based on one's income, the insured can change employers or add a second job without requesting permission from the insurance company. For the retirement account tax category, the insured can have multiple retirement accounts and change custodians without permission from the insurance company. In some embodiments, a variable universal life policy with an increasing death benefit structure has a total death benefit equal to the specified face amount and the market value of the investment sub-accounts. The investment sub-accounts are legally connected to the life insurance policy and cannot be accessed by the policy owner without going through the insurance company. The insurance policy will have rules on when the funds inside the investment sub-accounts can be accessed, limits on funding the sub-accounts, and penalties for withdrawing the funds. Another contrast to current variable life insurance contracts with an variable death benefit is the risk to the insurance company. The insurance company's true risk is the specified face amount which is typically fixed. The rest of the death benefit is simply the market value of the sub-accounts passed to the beneficiaries. Policy owners have flexibility to change the premium funding levels which impact the size of the sub-accounts, but this funding level has no bearing on the policy's face amount. There are two important distinctions to highlight. First, the investment sub-accounts are legally tied to the life insurance policy and filed with the regulators. Second, policy expenses and mortality charges are deducted from the investment sub-accounts. In effect, the performance of the sub-accounts is dependent on the amount of the mortality charges and other expenses since they impact the growth of the sub-accounts.

In embodiments disclosed herein, the insurance policy's death benefit is periodically adjusted by data outside the insurance policy. The size of the insurance policy and the premium cost has no bearing on the data itself, meeting the independence test. For example, the life insurance policy premium does not impact one's W2 income reported to the IRS, the value of their IRA or 401K. In some coverage categories there may be a remote link between the long-term data and the life insurance premium. For example, business partners purchase life insurance on the partners in a buy/sell arrangement. The business may pay the premium which in theory could impact the value of the business since the value of the business itself is ultimately impacting the amount of life insurance premium. However, the relative impact would likely be incidental and preserve the independence test.

In many embodiments, method 1700 can comprise an activity 1720 of determining a category for the dynamic death benefit based on a life insurance need of the insured individual. The category for the dynamic death benefit comprises at least one of: a benefit of the insured individuals earned income, a benefit of the insured individuals retirement account. In some embodiments, the benefit is tied to the insured's earned income (item 3 in FIG. 1). An example of qualifying data would be the insured's W2 filed with the IRS annually.

In some embodiments, the benefit is tied to the insured's retirement account balance (item 4 in FIG. 1). This may include the insured's individual retirement account, 401(K), 403(b) or any other type of retirement account that consists of pre-tax contributions that will be taxed either upon the death of the insured or upon distribution of funds to the beneficiary (for example, if the spouse is the beneficiary under current IRS rules). This category may also include annuities which also create a taxable event upon death in many cases. In some embodiments, the benefit is tied to the estimated federal estate tax liability (item 5 in FIG. 1). Calculating this benefit would entail a combination of specific data that estimates the insured's estate value and the current federal estate exemption levels and tax rates (both of which could change annually if passed by Congress). In some embodiments, the benefit is tied to the outstanding balance of a mortgage or other type of qualifying debt (item 6 in FIG. 1). A mortgage would be an example of a qualifying debt since it has a maturity date, payment schedule and the principal amount cannot be voluntarily increased by the mortgage holder (insured) without an approval process. An example of a non-qualifying debt would be credit card balances since they do not have a maturity date and associated amortization schedule. In some embodiments, the benefit is tied to the valuation of a business (item 7 in FIG. 1). Recalculating the benefit periodically would be based on an independent valuation of the business by an approved third-party. In some embodiments, the benefit is tied to accumulated investment losses on an investment account (item 8 in FIG. 1). The investment account could be a brokerage account, any retirement account, or combination thereof.

In some embodiments, determining the category comprises identifying a coverage category provided by the insured individual (e.g., item 1 in FIG. 1).

In many embodiments, method 1700 can comprise an activity 1730 of determining qualifying data to calculate a dynamic death benefit of the life insurance policy based on the category of insurance coverage. The qualifying data comprises information from the insured individual's income tax filing, or the insured individual's retirement account statement. For the category in item 3 (FIG. 1), the qualifying data come from the insured's income tax filing. For individuals that have an employer, the qualifying data would be the W2 form filed with the tax filing. For individuals that are self-employed, the qualifying data would come from Schedule C of the tax filing. Sourcing the data may come from the insured providing a copy of the tax filing, directly from the IRS, indirectly from a separate vendor such as the insured's tax preparation service, and/or the insured's employer. For the category in item 4 (FIG. 1), the qualifying data would come from the administrator(s) of the retirement account(s) listed on the application (item 1 in FIG. 1). Sourcing the data may come directly from the administrator or an account statement provided by the insured. For the category in item

5 (FIG. 1), the qualifying data would come from multiple sources. On the application (item 1 in FIG. 1), the insured would identify the assets and liabilities, their respective administrators or otherwise source of valuation, any ported exemptions from the insured's deceased spouses, and used to determine the estimated the amount of the estate subject to the estate tax. The estate tax is then determined by the exemption levels in effect for the current year and the federal estate tax rate. These exemption levels and tax rates would be sourced from current IRS tables. For the category in item 6 (FIG. 1), the qualifying data would be the reported balance on specified dates from the administrator(s) of the mortgages and debts listed on the application (item 1 in FIG. 1). For the category in item 7 (FIG. 1), the qualifying data would be the valuation of the business determined by a third-party firm that has been pre-approved by the insurance company. The data would be the business valuation determined as of a specific date set by the insurance company. For the category in item 8 (FIG. 1), the qualifying data would be the reported investment losses on specific accounts listed on the application (item 1, FIG. 1) over specific time periods that are covered by the insurance contract.

In many embodiments, method 1700 can comprise an activity 1740 of determining a frequency and timing of a data refresh based on the category of the dynamic death benefit and contractual requirements being serviced for the insured individual's insurance policy. The frequency of the qualifying data refresh comprises annually refreshing the qualifying data, and the timing of the qualifying data refresh comprises a time period corresponding to an annual tax filing, or periodic account statement for a retirement account. Frequency will usually be annual to coincide with the normal process of sending policy owners annual statements. For the coverage category tied to earned income, an annual frequency aligns with the annual submission of tax returns. Some coverage categories may utilize a frequency more often than annually. For example, the category identified in item 4 (FIG. 1) seeks a death benefit that resets periodically to the income tax liability of a qualified retirement account. Since qualified retirement account values are constantly changing due to contributions and market performance, the consumer may prefer the benefit be redetermined more frequently (e.g., quarterly, or semi-annually) to better align the coverage with the constantly changing tax liability. Some coverage categories may utilize a frequency less than annual, perhaps every two or three years, due to the cost or complexity of updating the qualifying data. One example is the complexity of estimating the value of the insured's estate (category identified by item 5, FIG. 1). Estates own assets such as homes and other property that may not have readily accessible market values. Another example is the business valuation category (item 7, FIG. 1). The cost of obtaining an independent valuation of a privately held small business may outweigh the benefits of having a life insurance policy closely tracking the insurance need. This category may call for a frequency of redetermining the benefit every 2, 3 or even 5 years.

Timing refers to the precise "as of" date during the year for capturing the data when it is available and factoring in adequate time for processing the changes and notifying the insured of the new benefit and premium required. As a result, the timing is dependent on both the coverage category (e.g., when is the data required for that category available for capture) as well as the individual policy's annual anniversary date. When the policy anniversary date—e.g., the date when the benefit changes are scheduled to be recomputed and take effect—are too close to the data's availability, some policies will need to be processed on greater lag time than others. For income category (item 3, FIG. 1), the qualifying data is the annual tax filing. The timing of the data availability impacts the administrative process. Policies with a January anniversary date will not have access to the prior calendar year tax filing as the employer may not have completed the W2 form and/or the insured has not completed their own tax return (in the case of the Schedule C for self-employed individuals). Therefore, policies purchasing during the first three months during the year will likely base their new death benefits on calendar year data 12 to 15 months prior. For other policies, the timing of the data may refer to the calendar year most recently closed due to when the data becomes availability. For the retirement account tax category (item 4, FIG. 1), the timing of the data may be linked to a year-end statement due to its common distribution to clients by all asset account administrators. Alternatively, retirement account administrators typically provide calendar quarter-end statements to client. If the frequency of the benefit rebalance was quarterly, the timing of the data gather may be based on availability of quarter-end data. In contract, insurance company annuity products are also retirement account instruments that create a tax liability upon death. However, annuity administrators provide annual statements to policy owners based on the policy's anniversary date. Lacking calendar quarter-end or year-end statements may impact timing of data availability for processing death benefit changes on a life insurance policy separate and independent from an annuity.

In many embodiments, method 1700 can comprise an activity 1750 of retrieving data specific to the category of insurance on the insured individual seeking life insurance coverage to recompute a death benefit. In some embodiments, retrieving the data specific to the category of insurance on the insured individual seeking life insurance coverage to recompute a death benefit, further comprises retrieving income data from at least one of a tax filing or W2 form, or retirement account statement. In some embodiments, the data specific to the category can include at least one of the following: income data from a tax filing and/or W2 form for the category identified in item 3, FIG. 1; data on the value of a retirement account from the account's administrator for the category identified in item 4, FIG. 1; data on the value of listed assets and liabilities on the insured's estate (from the respective administrators or independent appraiser for illiquid assets) and federal estate exemption thresholds and tax rates from the IRS; outstanding mortgage and debt balance from the respective administrators for the category identified in item 6, FIG. 1; the valuation of a business from an independent appraiser that is pre-approved by the insurance company for the category in item 7, FIG. 1; the amount of accumulated losses on an investment account from the administrator of each listed investment or retirement account covered under the policy for the category in item 8, FIG. 1.

In many embodiments, method 1700 can comprise an activity 1760 of retrieving rules and limitations on changes to the life insurance policy's recomputed death benefit specific to the category of coverage and that policy's particular circumstances. The rules and limitations comprise: functions and metrics corresponding to an income multiple and a calibrating variable. This refers to formulas and variables that are applied to the data received for the specific insurance coverage category on the insured to determine the policy death benefit for the forthcoming period. In the earned income category, one variable is the "income multiple". Before limitations are imposed on the upside or downside change in the benefit amount, the benefit would be determined as a multiplication of the insured's income (e.g., the qualifying data for the appropriate calendar year) and the "income multiple". For example, if the income multiple is 10.0 and the reported income was $50,000 then the benefit would be preliminarily set to $500,000 (10.0×$50,000). In the retirement account tax category, two variables are the tax rate (requested on the application) and the percentage of the account insured. Before any limitations are applied, the benefit amount would be determined as a multiplication of the retirement account value on the specified date, the tax rate and percentage insured. Typically, the percentage insured will be 100% but the insured could decide to insure less than 100% and/or certain events cause the ratio to be less than 100%. An example of a rule is highlighted in FIG. 1, step 9. There are different procedural paths depending on whether the initial application is submitted with the qualifying data (e.g., a copy of the insured's tax return or W2, or a copy of the required account statement for a retirement account).

If the application is received with the data, or the data can be retrieved from the administrator during the application process, the rule is to determine the calibrating variables in step 10 and proceed to the process outlined in FIG. 2. An example of a 'calibrating variable' is determining the 'income multiple' for a policy based on the initial requested face amount (death benefit) of the policy and the insured's income.

If the application is received without the data and it cannot be retrieved from the administrator during the application process, the rule is to proceed to step 11 in FIG. 1 with the application process without knowing the calibrating variables. If the policy is approved, the policy will be issued without knowing the calibrating variables for the first reset point at that time. The data will need to be retrieved before the first reset so the calibrating variable can be determined and used in calculating the death benefit for the next coverage period.

Limitations in the recalculated death benefit each period are designed to protect the insured from unwarranted reductions in benefits, and the insurance company from too much risk with increasing benefits without underwriting. The type of limitation is specific to the category of coverage which links to the nature of the need for the life insurance. For example, the category protecting the income has a limitation that the benefit cannot be reduced automatically in the event the insured's income declines. This protects the insured from losing life insurance at a time their income could be decreasing due to health reasons (e.g., precisely the point in the life that coverage is most needed). Step 70 in FIG. 5A compares the computed benefit based on the income data to their current benefit. With the limitation that the coverage cannot automatically decrease for this category of coverage, step 70 instructs the system to leave the benefit unchanged in step 71 if the data would otherwise reset the benefit lower. A limitation on the increase in benefits available without underwriting (e.g., automatic increase) is placed in step 72 in FIG. 5A. For each policy, a lifetime cap will be determined that sets an upper bound on the benefits. Additional benefits above this cap may be earned but the insured will need to be underwritten to reset the lifetime cap higher. In contrast to the example above, the retirement account tax coverage does not have a downside limitation. If a retirement account decreases 50%, the tax liability also decreases (hence the reduced need for life insurance for this purpose). Accordingly, FIG. 5B outlines the administrative procedures and there are no limitations that prevent the death benefit from automatically being reset lower should the retirement account value decrease. However, there is a limitation on the upside benefit (step 90 in FIG. 5B) similar with the earned income category. Over time the growth in an insured's retirement account(s) could significantly increase the death benefit (tax liability). The insurance company will need to manage its risk and set a limit on how much additional coverage it is willing to automatically grant the insured as their retirement account balance increases. FIG. 7 outlines the process for determining the lifetime cap for any category of life insurance coverage. Since the life insurance application could be a brand-new policy or a voluntary request for more coverage on an existing policy, step 133 in FIG. 7 identifies the different procedural paths necessary to determine the lifetime cap. Note that FIG. 7 is the general determination process that can be applied to any of the coverage categories identified in FIG. 1. The growth rate in benefits automatically produced based on the independent data will vary by the coverage category, age of insured, absolute size of the starting coverage, and any number of other variables.

In some embodiments, the rules are retrieved from memory of the computing device for each category of coverage by contract type and issue date, and the limitations are retrieved from the memory of the computing device when the computer system processes a periodic redetermination of the benefits.

In many embodiments, method 1700 can comprise an activity 1770 of determining a life insurance policy's revised death benefit, automatically and without new underwriting. In some embodiments, determining the life insurance policy's revised death benefit further comprises: 1) determining if the current date aligns with the policy's periodic rebalance date (See step 67 in FIG. 5A and step 86 in FIG. 5B); 2) retrieving the policy's benefit determination data and other factors from the insured individual's file to compute the revised death benefit (See step 69 in FIG. 5A and step 88 in FIG. 5b); 3) determining the preliminary new death benefit based on the insured's data and other factors (the first process in step 70, FIG. 5A and step 89, FIG. 5B); and 4) determining the new death benefit to the preliminary benefit based on the preliminary benefit satisfying an upward limitation tests and a downward limitation test. The computer applies any limitations on decreases in the death benefit as applicable to the policy's category of coverage. FIG. 5A illustrates the income-based coverage (item 3, FIG. 1) where a downward adjustment limitation applies. In step 70 the computer compares the preliminary death benefit to the current death benefit (a.k.a. face amount). Due to the limitation for this category of insurance, if the preliminary benefit is lower than the current benefit the system moves to step 71 to set the death benefit for the next period to be the same as the prior period. The process for FIG. 5B applies to the retirement account income tax category (item 4, FIG. 1) where no downward limitation applies. The computer checks if any upward adjustment limitations apply. In FIG. 5A the system moves to step 72 to check on this limitation. The same check is done in step 90 in FIG. 5B for that coverage category. In both examples, if the preliminary death benefit exceeds that policy's maximum, the computer sets the new death benefit to be equal to the cap in steps 73 and 91, respectively, for the different types of coverage. If the preliminary benefit passes both the upward and downward limitation tests for its applicable coverage category, the computer system sets the new death benefit to the preliminary benefit. For the income-based category in FIG. 5A, step 74 handles this process. For the retirement account tax category in FIG. 5Ab, step 92 handles this process.

In many embodiments, method 1700 can comprise an activity 1780 of servicing the life insurance policy with a death benefit that is dynamically redetermined periodically based on independent data unique to the category of insurance coverage and specific to the individual seeking life insurance benefits changing dynamically as represented by the independent data. Servicing the life insurance policy further comprises a new premium for each policy based on the insured individual's underwriting class and new benefit amount. Computing the new premium for each policy is based on the insured's underwriting class and new benefit amount. Unlike many traditional term insurance policies where the death benefit is fixed and the premium is fixed at the same level for 10, 20 or 30 years, a life insurance policy that has a death benefit changing periodically (e.g., annually) based on independent data unique to the insured and unknown in advance, the premium will need to be recomputed every time the death benefit changes. For the income-based category illustrated in FIG. 5A, the new premium is computed in step 75. For the retirement account tax category illustrated in FIG. 5B, the new premium is computed in step 93. Notifying the policy owner of the new benefit amount and the change in premium. This is processed in steps 77 and 95, respectively, for the two categories illustrated in FIGS. 5A and 5B. Delivering annual statements to customers which typically include a summary of benefits for the prior year, premiums paid, and beneficiaries of record. The annual statement servicing will also need to communicate information unique to the policy such as lifetime caps that may be impacting their growth in benefits, the factors used to determine their benefits (such as the income multiple factor for the income-based category of insurance), the official data of record that was used to compute the benefits. The annual statement may also include reminders on deadlines when documentation must be submitted for the next benefit redetermination (if the system cannot retrieve any qualifying data directly from an administrator and instead, must rely on the insured submitting copies of account statements, tax returns, W2 forms, etc). Collecting premium and applying credit to the insured's account. This is highlighted in steps 80 and 97, respectively, for the two categories of coverage illustrated. Handling a customer change request such as voluntary increase in face amount whereby benefits wish to be increased above the amount that is automatically determined by the insured's qualifying data. FIG. 6 illustrates this process starting with step 104. Handling a customer change request such as a voluntary decrease in face amount. FIG. 6 illustrates this process starting with step 126. Handling a customer request to change the policy beneficiary. FIG. 6 illustrates this process starting with step 131. Handling a policy termination triggered by a premium not being paid. FIG. 8 illustrates this process starting with step 150. Handling a customer's request to terminate their policy. FIG. 8 illustrates this process starting with step 153. Handling a death claim involves retrieving the most current death benefit, paying the claim and updating the customer file. FIG. 8 illustrates this process starting with step 155.

Returning to FIG. 9, in several embodiments, the system of FIG. 9 can at least partially perform the method 1700 of FIG. 17. In some embodiments, the system of FIG. 9 can perform the method of FIG. 17 and the method of FIGS. 1-8.

Figure 18A:
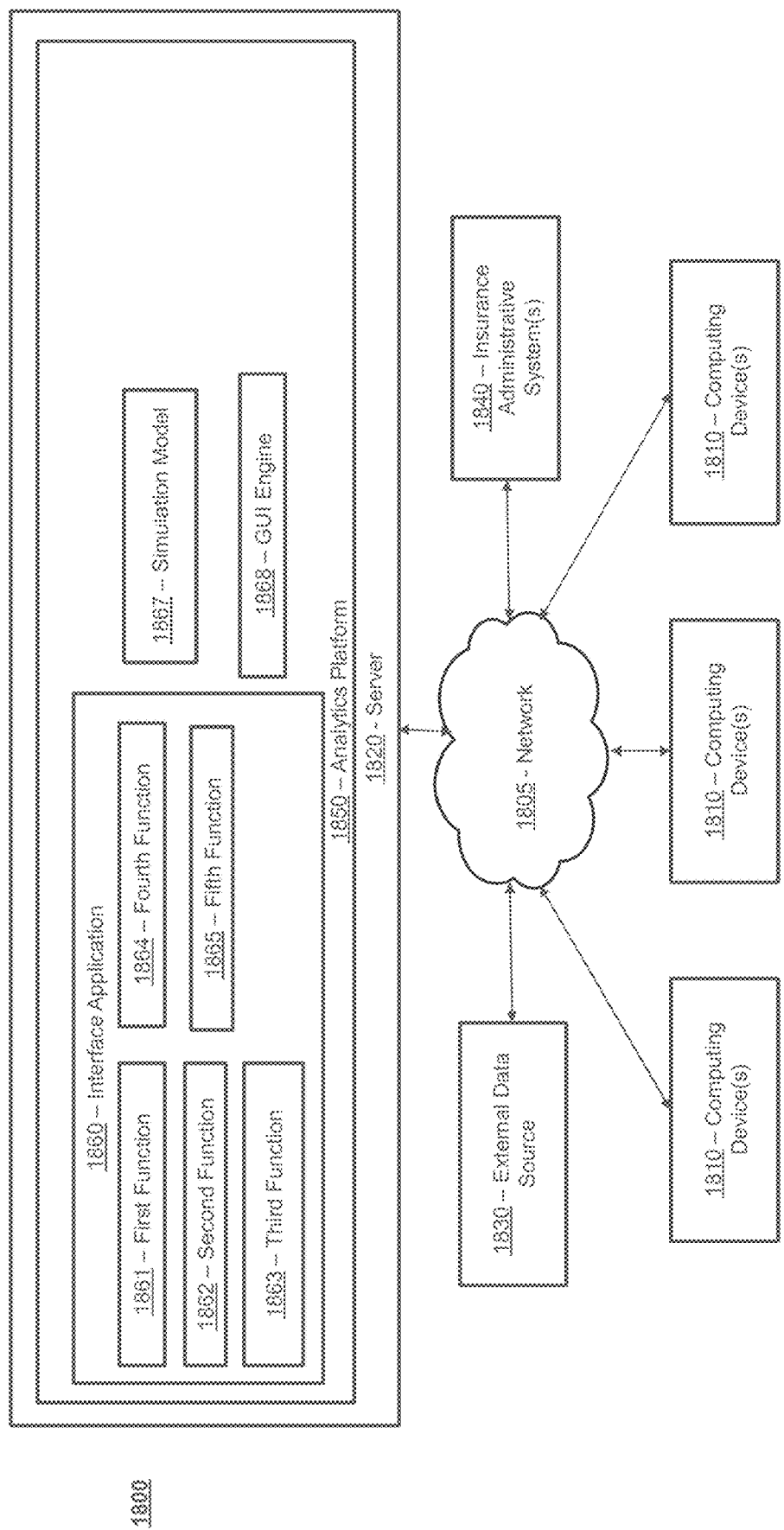
FIG. 18A is a block diagram of an exemplary system in accordance with certain embodiments.
Figure 18B:
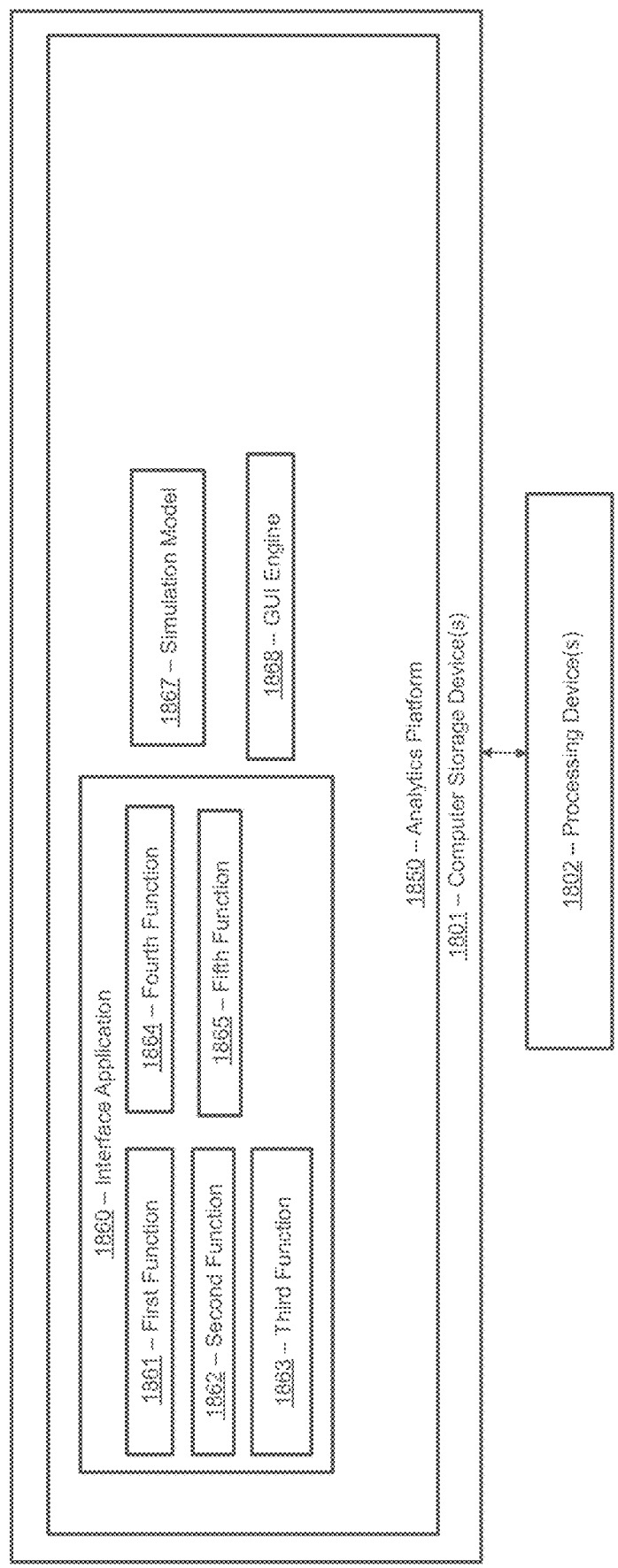
FIG. 18B is a block diagram illustrating exemplary features of an analytics platform in accordance with certain embodiments.

FIG. 18A is a block diagram of an exemplary system 1800 in accordance with certain embodiments that includes, inter alia, an analytics platform 1850. FIG. 18B is a block diagram illustrating exemplary features, components, and/or functions associated with the analytics platform 1850. FIGS. 18A and 18B are jointly discussed below.

The system 1800 comprises one or more computing devices 1810, one or more servers 1820, one or more external data sources 1830, and one or more insurance administrative systems 1840 that are in communication over a network 1805. An analytics platform 1850 is stored on, and executed by, the one or more servers 1820. The network 1805 may represent any type of communication network, e.g., such as one that comprises one or more of a local area network (e.g., a Wi-Fi network), a personal area network (e.g., a Bluetooth network), a wide area network, an intranet, the Internet, a cellular network, a television network, and/or other types of networks.

All the components illustrated in FIG. 18A, including the one or more computing devices 1810, one or more servers 1820, one or more external data sources 1830, and one or more insurance administrative systems 1840, and analytics platform 1850 can be configured to communicate directly with each other and/or over the network 1805 via wired or wireless communication links, or a combination of the two. Each of the computing devices 1810, servers 1820, external data sources 1830, insurance administrative systems 1840, and analytics platform 1850 can include one or more communication devices, one or more computer storage devices 1801, and one or more processing devices 1802 (FIG. 18B) that are capable of executing computer program instructions.

The one or more computer storage devices 1801 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 1801 may be physical, non-transitory mediums. The one or more computer storage devices 1801 can store, inter alia, instructions associated the implementing the functionalities of the analytics platform 1850 described herein.

The one or more processing devices 1802 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 1802 can be configured to execute any computer program instructions that are stored or included on the one or more computer storage devices 1801 including, but not limited to, instructions associated the implementing the functionalities of the analytics platform 1850 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 1810, servers 1820, external data sources 1830, insurance administrative systems 1840, and/or analytics platform 1850 to be connected to the Internet and/or other network. The modem devices can permit bi-directional communication between the Internet (and/or other network) and the computing devices 1810, servers 1820, external data sources 1830, insurance administrative systems 1840, and/or analytics platform 1850. In certain embodiments, one or more router devices and/or access points may enable the computing devices 1810, servers 1820, external data sources 1830, insurance administrative systems 1840, and/or analytics platform 1850 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 1810, servers 1820, external data sources 1830, insurance administrative systems 1840, and/or analytics platform 1850 to access the Internet and/or other networks.

In certain embodiments, the computing devices 1810 may represent desktop computers, laptop computers, mobile devices (e.g., smart phones, personal digital assistants, tablet devices, vehicular computing devices, wearable devices, or any other device that is mobile in nature), and/or other types of devices. The one or more servers 1820 may generally represent any type of computing device, including any of the aforementioned computing devices 1810. The one or more servers 1820 also can comprise one or more mainframe computing devices and/or one or more virtual servers that are executed in a cloud-computing environment. In some embodiments, the one or more servers 1820 can be configured to execute web servers and can communicate with the computing devices 1810, external data sources 1830, insurance administrative systems 1840, and/or other devices over the network 1805 (e.g., over the Internet).

In certain embodiments, the analytics platform 1850 can be stored on, and executed by, the one or more servers 1820. Additionally, or alternatively, the analytics platform 1850 can be stored on, and executed by, the one or more computing devices 1810 and/or other suitable computing devices.

In some embodiments, the analytics platform 1850 also can be stored as a local application on a computing device 1810, or interfaced with a local application stored on a computing device 1810, to implement the techniques and functions described herein. The computing device 1810 may be part of insurance administrative system 1840 in some scenarios.

The insurance administrative systems 1840 can generally correspond to third-party systems, networks, and/or devices that access the analytics platform 1850 and/or utilize the data generated by the analytics platform 1850. For example, the insurance administrative systems 1840 can be operated and managed by businesses, and/or other entities that utilize the analytics platform 1850 (including data generated by the analytics platform 1850) to improve the functionalities of one or more systems and/or one or more applications. For example, the insurance administrative systems 1840 can be an insurance carrier that utilizes the output from the analytics platform 1850 to generate life insurance products.

Each of the insurance administrative systems 1840 may include one or more computing devices, such as computing devices 1810 that enable the insurance administrative systems 1840 to access the analytics platform 1850 over the network 1805. In some cases, one or more of the insurance administrative systems 1840 may include sophisticated technological infrastructures, such those that include enterprise systems, servers, such as servers 1820, virtual private networks (VPNs), intranets, etc. The computing devices 1810, servers 1820, and/or other devices associated with each insurance administrative system 1840 can store and execute various applications (e.g., such as insurance products, etc.). The insurance administrative systems 1840 and associated applications can leverage the data provided by the analytics platform 1850 in various ways.

In certain embodiments, the analytics platform 1850 can be integrated with (or can communicate with) various applications hosted by the insurance administrative systems 1840 including, but not limited to, applications that provide products or services for insurance needs. In certain embodiments, the analytics platform 1850 additionally, or alternatively, can be integrated with (or can communicate with) other applications. For example, servers 1820 and analytics platform 1850 could be hosted by a third party and interface with one or more insurance administrative systems 1840 over network(s) 1805.

The aforementioned applications and/or other applications, each of which may be integrated or interfaced with the analytics platform 1850, can be stored on one or more insurance administrative systems 1840 in some embodiments. For example, the aforementioned applications and/or other applications can be stored on one or more computing device 1810 and/or one or more servers 1820 associated with one or more insurance administrative systems 1840.

As discussed throughout this disclosure, the analytics platform 1850 can generally provide functions associated with analyzing insurance conditions associated with individuals. In certain embodiments, the analytics platform 1850 is implemented with an interface application 1860 that enables a user to interact with a user interface to modify functions and produce life insurance products that can be utilized with insurance administrative systems 1840. The interface application 1860 is utilized by a user to create a customized, life insurance product where the death benefits automatically change periodically, up or down without new underwriting. The interface application 1860 can facilitate a user interface displaying a plurality of functions for a prospective that may be numbers, tables, formulas, or data relationship components.

In the illustrated embodiments, the interface application 1860 (e.g., a formula field or data relationship component) can include a plurality of adjustable functions that facilitate forecasting the insured's life insurance needs and determining the changes in future benefits provided by the dynamic death benefit life insurance policy, and enable the insured to view and evaluate a variety of possible combinations of current and future death benefits and insurance costs prior to formally applying for the dynamic death benefit life insurance policy. The interface application 1860 can display one or more functions of a formula field or a data relationship component to the insured in purchasing dynamic life insurance, wherein the formula field or data relationship component includes one or more of a variable chart and variable table, the one or more functions including corresponding to the interface application 1860 and comprising, for example, a first function 1861, a second function 1862, a third function 1863, a fourth function 1864, and a fifth function 1865. In the illustrated embodiment, the analytics platform 1850 includes a graphical user interface (GUI) engine 1868 that coordinates the inputs from the interface application with a simulation model 1867.

In certain embodiments, the simulation model 1867 can be implemented as separate algorithms, modules, components, spreadsheets, or any other suitable computer application or software and interface with the GUI engine 1868 and/or interface application 1860, such as via application programming interfaces (APIs). Alternatively, or additionally, the simulation model 1867 can be implemented together with or as part of GUI engine 1868 and/or interface application 1860.

The first function 1861 corresponds to correlating the dynamic death benefit life insurance policy to the insured's earned income in an individual policy independent of any particular employer relationship while including all sources of earned income. The first function 1861 can be displayed on a GUI via the GUI engine 1868 to enable a user to modify information related to the first function 1861.

The second function 1862 corresponds to projecting the insured's future earned income, wherein the second function includes, via the formula field, data relationship component, variable table, one or more user input fields, or a combination thereof, receiving the insured's current income and projecting the insured's future income by dynamic death benefit life insurance policy duration since issue, insured's age, or other criteria. The second function 1862 can be displayed on a GUI via the GUI engine 1868 to enable a user to modify information related to the second function 1862.

The third function 1863 corresponds to determining the requested dynamic death benefit life insurance policy's initial face amount of death benefit being applied for and future increases in benefits, wherein the third function includes, via the formula field, data relationship component, variable table, and/or the user input fields, or a combination thereof, determining the dynamic death benefit life insurance policy benefit changes relative to the future earned income. The third function 1863 can be displayed on a GUI via the GUI engine 1868 to enable a user to modify information related to the third function 1863.

The fourth function 1864 corresponds to determining an estimate of the proposed insured's current health status for the dynamic death benefit life insurance policy prior to the insurance company underwriting a formal application, the health status corresponding to an expected underwriting class, wherein the fourth function includes displaying risk input fields for age, gender, smoker status, and general health assessment fields with computer-assisted definitions to assist the insured in estimating an underwriting class. The fourth function 1864 can be displayed on a GUI via the GUI engine 1868 to enable a user to modify information related to the fourth function 1864.

The fifth function 1865 corresponds to the insured specifying if the requested dynamic death benefit life insurance policy is a stand-alone dynamic death benefit life insurance policy or additional death benefit to be added to an existing dynamic death benefit life insurance policy, with existing dynamic death benefit life insurance policy fields to input existing contract information if applicable, upon which the user interface system can transmit a request to the administrative system to obtain information on the existing dynamic death benefit life insurance policy such as current death benefit amount, underwriting class, limitations on death benefit increase without additional underwriting, and the third function formulas, variable tables, data relationship components and other factors that determine available death benefit increases without underwriting on previously approved death benefit. The fifth function 1865 can be displayed on a GUI via the GUI engine 1868 to enable a user to modify information related to the fifth function 1865.

The analytics platform 1850 can process the modifications to the first function 1861, the second function 1862, the third function 1863, the fourth function 1864, and/or the fifth function 1865 in a number of ways. The following are embodiments illustrating the operation of the analytics platform 1850. In a first embodiment, in response to: (i) the insured selecting the income linked death benefit in the first function, and (ii) the insured adjusting the second function via the formula fields or the data relationship component, the analytics platform 1850 utilizes the adjustments to the second function to calculate and display via the tables, the graphs, and the related formula fields, user input or data relationship components, the current and the future earned income projected by the user interface. In a second embodiment, in response to: (i) the insured selecting the income linked death benefit in the first function, and (ii) the insured adjusting the second, third and fourth functions via the formula fields or the data relationship component, and the fifth function indicating a new stand-alone dynamic death benefit life insurance policy is being requested, the analytics platform 1850 utilizes the adjustments to the second, third and fourth functions to calculate and display via tables, graphs, and related formula fields, user input or data relationship components the initial and future life insurance benefits needed based, at least in part, on assumptions provided by the insured, and the insurance benefits to be provided by the dynamic death benefit life insurance policy relative to any adjustment limitations imposed by the existing dynamic death benefit life insurance policy and expected to be imposed by the dynamic death benefit life insurance policy based on the insured-provided fields in the second, third, and fourth functions. In a third embodiment, in response to: (i) the insured selecting the income linked death benefit in the first function, and (ii) the insured adjusting the second, third and fourth functions via the formula fields or the data relationship component, and the fifth function indicating the death benefit requested is additional death benefit on an existing dynamic death benefit life insurance policy, the analytics platform 1850 utilizes the adjustments to the second, third and fourth functions to calculate and display via tables, graphs, and related formula fields, user input or data relationship components the initial and future life insurance benefits, and the insurance benefits to be provided by the dynamic death benefit life insurance policy relative to any adjustment limitations imposed by the existing dynamic death benefit life insurance policy and/or imposed on the requested additional death benefit based on the insured-provided fields in the second, third, and fourth functions.

In some embodiments, the analytics platform 1850 calculates and displays via graphics, tables, the formula field or the data relationship components, the projected premium each year, segmented between the underwriting class and death benefit provided for an existing dynamic death benefit life insurance policy and new death benefit being requested, based on the insured's adjustments to the second, third, and/or fourth functions in the formula fields, the tables or the data relationship components, needed to estimate the premium rate per unit for all types of dynamic life insurance benefits projected in the future, and the system may forecast the current premium rates based on an approved underwriting class for the existing death benefit and estimated underwriting class based on user input in the fourth function prior to formal application submission.

In some embodiments, subsequent to the dynamic death benefit life insurance policy being issued, the analytics platform 1850 can execute at least one of the following: (1) transmit a notification to the insured to access the insured's life insurance policy account, in response to the benefit amount being updated, and, in response to the insured accessing the life insurance policy account, displaying, via the formula field or the data relationship component of the user interface, the insured's updated benefit amount and new premium required; (2) enable the insured to make voluntary changes to the insured's benefit amount based on the insured adjusting the third function formula field, the variable tables, the user input, or the data relationship component, the third function determining a reduction in the policy death benefit, in response to which the system recomputes the current premium required based on the revised benefit amount, underwriting class, insured's current age, and/or which death benefit is being reduced if the policy contains death benefit purchased and underwritten at multiple times; (3) in response to the insured engaging with the user interface to adjust the fifth function in the formula field or the data relationship component to request an increase in additional death benefit, the system will engage an underwriting process for the requested increase in death benefit, recompute the current premium, incorporate any updates to the second, third and fourth function variables, formulas, or tables to define the current and future additional death benefit in relation to the future earned income, and display the changes to the insured graphically, via the tables and/or the formulas or the data relationship component, showing the requested combined dynamic death benefit life insurance policy and the existing dynamic death benefit life insurance policy death benefit information separate from the requested increase in death benefit; (4) wherein, the first function, second function, third function, fourth function, and/or fifth function of the user interface enable the insured to simulate and evaluate, in real-time different possible combinations of initial insurance death benefit and future changes to benefits and view, in real-time, information from the management component corresponding to such simulated combinations, including information about the projected cost, future benefits, and/or death benefit limitations. In some embodiments, the analytics platform 1850, in response to receiving an indication that the insured has completed all inputs and changes to the dynamic death benefit life insurance policy through the user interface, submits a formal application for the dynamic death benefit life insurance policy to a third-party system associated with an insurance carrier.

Figure 19:
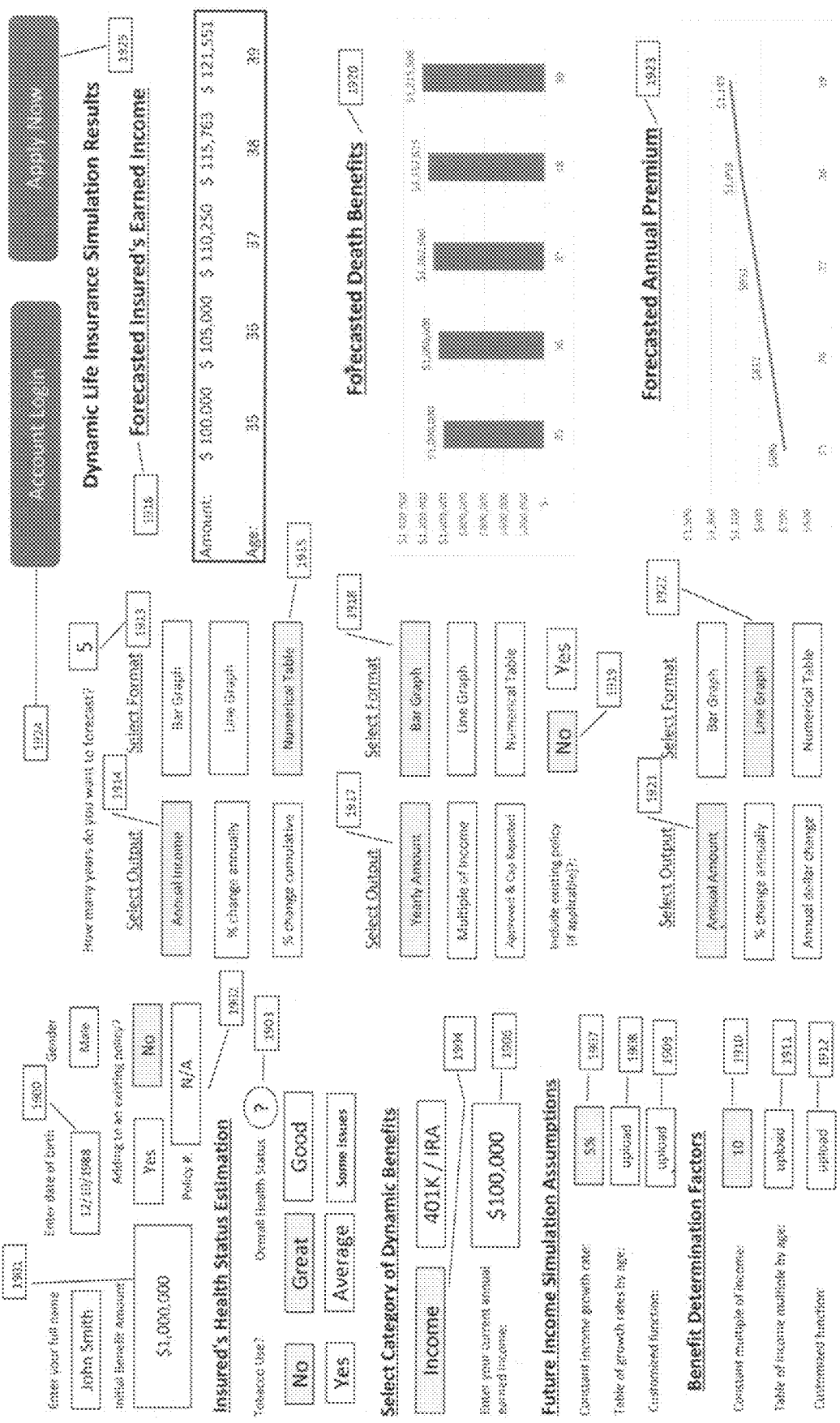
FIG. 19 illustrates an example user interface in accordance with certain embodiments simulating a dynamic benefits policy where the benefits are linked to the insured's earned income.
Figure 20:
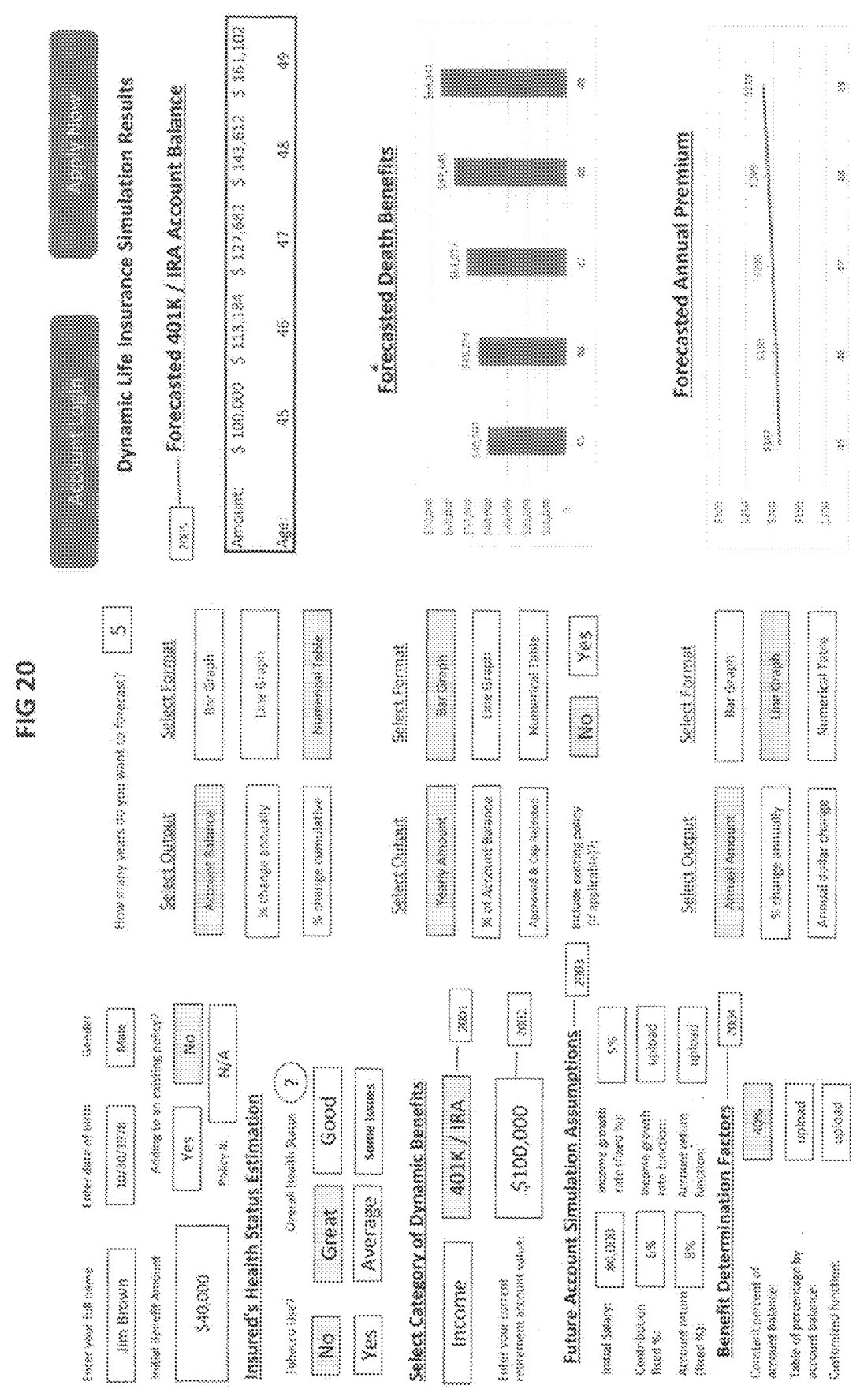

The GUI engine 1868 displays the first function 1861, the second function 1862, the third function 1863, the fourth function 1864, and/or the fifth function 1865 to a user, such as shown in the exemplary embodiments illustrated in FIGS. 19-20. In some embodiments, the GUI engine 1868 displays the information numerically, graphically, or other means by needs category and/or in totality, and provides adjustable input fields to change the coverage on any category or multiple categories, or revise any input field, and receive real-time changes. In some embodiments, the GUI engine 1868 enables the insured to simulate and evaluate, in real-time, different inputs and forecasting assumptions that determine the insured's needs and view, in real-time, the information, enabling the insured to optimize their insurance policy. In some embodiments, the GUI engine 1868 submits a formal application to a third-party system (e.g., insurance administrative system 1840) associated with an insurance carrier in response to receiving a request through the GUI engine 1868.

In some embodiments, users or operators may utilize various gestures to make selections and provide inputs via the GUI engine 1868. Other input mechanisms (e.g., mouse devices, keyboards, input buttons, etc.) also may be utilized to make selections and provide inputs.

In certain embodiments, the GUI engine 1868 can include both a display (e.g., an LCD or liquid crystal display) device and capacitive sensing medium that is configured to detect touches and gestures. In some cases, the capacitive sensing medium can be configured to detect the location where the touch screen display is engaged or touched by an object (e.g., a user's figurer or stylus), the time and duration of each engagement or touching of the touch screen display, and/or the pressure exerted each instance the touch screen display is engaged or touched. The capacitive sensing medium also can generate signals indicating the same. The capacitive sensing medium can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium can be configured to detect various types of gestures. Exemplary gestures that may be utilized to provide inputs via the capacitive sensing medium and/or touch screen displays of the GUI engine 1868 can include: Tap Gestures: Touch or tap one finger on the touch screen display; Touch and Hold Gestures: Touch the touch screen display and hold in place for a predetermined period of time (e.g., 1-3 seconds); Swipe Gestures: Touch the touch screen display, and move or drag a finger in a direction across touch screen display; Scroll Gestures: Move or drag one finger across the touch screen display without lifting, and capable of moving bi-directionally (e.g., up and down or side to side); Zoom Gestures: Place two fingers on the touch screen display near each other and spread them apart to zoom in, or move them toward each other to zoom out. Other types of gestures also may be utilized to provide inputs and selections via the GUI engine 168. It should be understood that any portion of this disclosure that describes selections, inputs, or the like being received on an interface can be provided by usage of one or more of the aforementioned gestures.

FIGS. 19 and 20 illustrate exemplary user interface outputs that can be generated by the GUI engine 1868. References in the paragraphs below to a user interface refer to the operation of the exemplary GUI engine 1868.

FIG. 19 illustrates a user interface to evaluate and simulate a dynamic death benefit policy linked to an insured's earned income. Item 1900 identifies basic insured information such as their name, date of birth, and gender. Item 1901 is an input field for the applicant to specify the initial death benefit. Item 1902 corresponds to the fifth function 1865 described above where the applicant identifies if the requested coverage is an increase to an existing policy and an input field for the policy number, if applicable. Item 1903 corresponds to the fourth function 1864 described above where the applicant/insured estimates their health status prior to the formal application and underwriting so the projection can provide a more accurate estimate of the annual premiums. The circled question mark pop up provides definitions on the health status options, which, in certain embodiments could be displayed in a separate pop-up window or other suitable display mechanism.

The input process on FIG. 19 continues with the first function 1861 where the applicant/insured selects the dynamic benefit category. Item 1904 indicates the income category selection in this example and corresponds to step 4 in FIG. 1. This election can also determine which categories and descriptions will be shown on the user interface thereafter (e.g., items 1907 through 1912). Item 1906 provides an input field for the applicant to enter their current annual earned income which, in combination with the benefit determination parameters in items 1910 through 1912, can be used to determine the initial benefit amount. The initial death benefit can have a significant impact on the policy underwriting requirements as well as the limitations on automatic increases in benefits.

Continuing down the input column in FIG. 19, the second function 1862 corresponds to simulating the insured's future income with input options 1907 through 1909. In this example, the user selected a constant 5% annual increase in item 1907. The system provides the user with an option in item 1908 to upload a table with yearly percentage increases, or a more sophisticated option in item 1909 to upload a formula (e.g., percentage increases that vary by age, proximity to retirement age, and/or level of earned income).

Continuing further down the input column in FIG. 19, the third function 1863 corresponds to the benefit determination factors represented by items 1910 through 1912, and will determine the future death benefits based on the income simulated. These factors correspond to step 33 in FIG. 2. The first option illustrated in this example is a simple constant multiple of income (item 1910). In this example the user selected a fixed multiple of 10 which means the death benefit would be reset to 10 times the insured's earned income (subject to downward limitations if their income decreased and also subject to upward limitations imposed by the insurance carrier). Item 1911 provides a more robust option where the insured could request the "income multiple" to be age dependent (e.g., upload a table of age-based factors). Item 1912 is the most sophisticated option where the insured specifies a formula to determine the benefits which could be a function of the insured's age, years since the policy is issued, years until a stated retirement age, level of income, or any combination thereof.

The right side of FIG. 19 provides the simulated output on the insured's forecasted income based on their assumptions provided (item 1916), the resulting death benefits after all limitations reflected (item 1920), and the yearly premiums for the forecasted death benefits (item 1923) based on the estimated health status provided in item 1903. The user interface provides several options to format the output, starting with item 1913 to specify how many years to forecast. Next, the user selects which output format to provide for the forecasted income (item 1914) and the format of the output (item 1915). Moving down the page to the forecasted death benefits, the user has several output options (item 1917) and format options (item 1918). If the insured had indicated this application is additional coverage to an existing option, item 1919 provides an option to view the output only for the new coverage or comingled with the existing policy. Note that item 1917 provides several options for the user to view the forecasted death benefits including showing future increases in death benefits impacted by the policy limitations. Upon seeing future benefits being limited, the user can easily change the benefit determination parameters in items 1910 through 1912, increase the initial coverage that will be underwriting, and observe the additional premium required to reduce or eliminate the potential for future limitations on benefit increases. Finally, items 1921 and 1922 allow the user to select the type of premium information and its format, respectively.

At the top of FIG. 19 is an illustration of an account login access (item 1924) and an apply now button (item 1925). In certain embodiments, the apply button feeds to step 12 in FIG. 2 and step 32 in FIG. 3. Prospective buyers using the simulation for the first time may create an account in item 1924 and store their simulated information for further consideration at a later time. The user may also update documentation related to the data that will determine their future benefits or validate the benefit determinate factors entered in items 1910 through 1912 are consistent with the initial benefit amount requested in item 1901 (e.g., IRS form W2 for their earned income) via the account login gateway accessed by selecting button 1924.

The process steps outlined in FIG. 2 are executed when the relevant data has been uploaded; otherwise, the system proceeds to the process steps in FIG. 3. When the benefit determination factors requested in FIG. 19's items 1910 through 1912 and the uploaded data do not correlate with the initial benefit in step 1901, the benefit determination factors are adjusted in step 16 of FIG. 2. Uploading data feeds into step 13 in FIG. 2.

FIG. 3 can accommodate new policy applications that have not submitted documentation on the historical data aligned with the category of insurance coverage being applied for. Step 32 in FIG. 3 receives the application that is completed from the Apply Now button 1925 in FIG. 19. Step 33 in FIG. 3 stores the requested benefit determination factors obtained from the user interface, FIG. 19 items 1910 through 1912, until possible adjustment when the historical data is uploaded.

The account login access in FIG. 19 (item 1924) is the system access for existing policyholders to submit a change request in FIG. 6's step 103.

FIG. 20 is a similar user interface example as FIG. 19 except the insured elected benefits linked to their 401K/IRA balance in item 2001. Electing the retirement account category in item 2001 activates step 5 in FIG. 1 for informing the administrative system which methods to apply. Item 2002 provides an input field for the insured's current account balance. Moving down the input column, item 2003 involves providing assumptions for the system to forecast the insured's future account balance. Item 2003 provides several input functions for the system to simulate the insured's future retirement account balance. Item 2004 provides several options to define how the insured's death benefit will change in relation to their retirement account balance ranging from a simple fixed percentage (e.g., 40%) to a sophisticated input function provided by the user. The interface simulation output starts with the forecasted retirement account balance (item 2005). The forecasted death benefits and annual premium can be based on the forecasted account balance and the limitations and restrictions applicable to this category of coverage.

In some embodiments, the user interfaces in FIGS. 19 and 20 are interactive user interfaces that can modify the simulated output on the insured's forecasted income based on their assumptions provided (item 1916), the resulting death benefits after all limitations reflected (item 1920), and the yearly premiums for the forecasted death benefits (item 1923), and the forecasted retirement account balance (item 2005). For example, a user can modify items 1916, 1920, 1923, and 2005 by using gesture enabled features on the user interface to slide points on item 1923, move items on item 1920, and modify information on item 1916, 2005. The modifications to items 1916, 1920, 1923, and 2005 will subsequently update the corresponding information in the user interface.

In some embodiments, the items 1916, 1920, 1923 can be displayed in a single user interface. For example, the information displayed in items 1916, 1920, 1923 can be overlaid on each other for the user to visualize each item. In other embodiments, the user interface can include various other functions in addition to the functions 1861, 1862, 1863, 1864, 1865 discussed above. For example, the user interface can include a pie graph that includes interactive functions that a user can interact with and modify to update and execute a transaction related to embodiments disclosed herein. In some embodiments, the user interface can include various other input fields, output fields, etc. For example, the user interface can include other known user interface components that can receive information from and/or display information to the insured or other users. For example, the user interface can include an output display with various sliding input fields that modify a corresponding data relationship (e.g., graph, table, etc.) and include a function a user can interact with to execute a transaction related to embodiments disclosed herein Embodiments disclosed herein are directed to an individual product that automatically evolves with consumer's changing need for life insurance benefits. Automatic increases in benefits without new underwriting would help reduce the coverage gap for the consumer currently caused by fixed benefit products. Embodiments disclosed herein allow insureds that experience changes in health to maintain the amount of insurance needed without the risk of unaffordable premiums or rejection for more coverage. Automatic reduction in benefits when the insured's need for life insurance decreases offers convenience and consumer savings.

Embodiments disclosed herein are directed to changes in benefits without underwriting based on a) the data used to recalculate one's insurance benefit that correlated to the individual's need for life insurance, and b) the data could not be influenced or controlled by the insured, thus preventing the possibility of anti-selection.

Such techniques of changes to benefits without underwriting also provide technological benefits. In many embodiments, the techniques described herein can provide a practical application and several technological improvements. In some embodiments, the techniques described herein can provide for changes to benefits without underwriting, thereby reducing the amount of processing that needs to be done by computing systems that require underwriting. Further, changes to benefits without underwriting reduces the amount of electronic transmissions between servers, thereby freeing up computing resources. Further still, embodiments disclosed herein reduce storage requirements by not having to store any additional information corresponding to additional underwriting that may be required by prior methods.

In many embodiments, the techniques described herein can be used continuously at a scale that cannot be reasonably performed using manual techniques or the human mind. For example, processing millions of data points while a user is inputting information within milliseconds cannot be feasibly completed by a human.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-17 may be modified, and that the foregoing discussion of certain of these embodiments does not necessarily represent a complete description of all possible embodiments. For example, one or more of the procedures, processes, or activities of FIG. 1-8 and/or 17 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system for administering a dynamic death benefit life insurance policy wherein the death benefit changes periodically and automatically without new underwriting based on data corresponding to an insured's life insurance needs comprising:

a user interface including a plurality of adjustable functions that facilitate forecasting the insured's life insurance needs and determining the changes in future benefits provided by the dynamic death benefit life insurance policy, and enable the insured to view and evaluate a variety of possible combinations of current and future death benefits and insurance costs prior to formally applying for the dynamic death benefit life insurance policy;

the user interface displaying a plurality of functions of a formula field or a data relationship component to the insured in purchasing dynamic life insurance, wherein the formula field or data relationship component includes one or more of a variable chart and variable table, the plurality of functions including:

a first function corresponding to correlating the dynamic death benefit life insurance policy to the insured's earned income in an individual policy independent of any particular employer relationship while including all sources of earned income;

a second function corresponding to projecting the insured's future earned income, wherein the second function includes, via the formula field, data relationship component, variable table, one or more user input fields, or a combination thereof, receiving the insured's current income and projecting the insured's future income by dynamic death benefit life insurance policy duration since issue, insured's age, or other criteria;

a third function corresponding to determining the requested dynamic death benefit life insurance policy's initial face amount of death benefit being applied for and future increases in benefits, wherein the third function includes, via the formula field, data relationship component, variable table, and/or the user input fields, or a combination thereof, determining the dynamic death benefit life insurance policy benefit changes relative to the future earned income;

a fourth function corresponding to determining an estimate of the proposed insured's current health status for the dynamic death benefit life insurance policy prior to the insurance company underwriting a formal application, the health status corresponding to an expected underwriting class, wherein the fourth function includes displaying risk input fields for age, gender, smoker status, and general health assessment fields with computer-assisted definitions to assist the insured in estimating an underwriting class; and a fifth function corresponding to the insured specifying if the requested dynamic death benefit life insurance policy is a stand-alone dynamic death benefit life insurance policy or additional death benefit to be added to an existing dynamic death benefit life insurance policy, with existing dynamic death benefit life insurance policy fields to input existing contract information if applicable, upon which the user interface system transmits a request to the administrative system to obtain information on the existing dynamic death benefit life insurance policy such as current death benefit amount, underwriting class, limitations on death benefit increase without additional underwriting, and the third function formulas, variable tables, data relationship components and other factors that determine available death benefit increases without underwriting on previously approved death benefit;

in response to: (i) the insured selecting the income linked death benefit in the first function, and (ii) the insured adjusting the second function via the formula fields or the data relationship component, the user interface utilizes the adjustments to the second function to calculate and display via the tables, the graphs, and the related formula fields, user input or data relationship components, the current and the future earned income projected by the user interface;

in response to: (i) the insured selecting the income linked death benefit in the first function, and (ii) the insured adjusting the second, third and fourth functions via the formula fields or the data relationship component, and the fifth function indicating a new stand-alone dynamic death benefit life insurance policy is being requested, the user interface utilizes the adjustments to the second, third and fourth functions to calculate and display via tables, graphs, and related formula fields, user input or data relationship components the initial and future life insurance benefits needed based, at least in part, on assumptions provided by the insured, and the insurance benefits to be provided by the dynamic death benefit life insurance policy relative to any adjustment limitations-imposed by the existing dynamic death benefit life insurance policy and expected to be imposed by the dynamic death benefit life insurance policy based on the insured-provided fields in the second, third, and fourth functions;

in response to: (i) the insured selecting the income linked death benefit in the first function, and (ii) the insured adjusting the second, third and fourth functions via the formula fields or the data relationship component, and the fifth function indicating the death benefit requested is additional death benefit on an existing dynamic death benefit life insurance policy, the user interface utilizes the adjustments to the second, third and fourth functions to calculate and display via tables, graphs, and related formula fields, user input or data relationship components the initial and future life insurance benefits, and the insurance benefits to be provided by the dynamic death benefit life insurance policy relative to any adjustment limitations imposed by the existing dynamic death benefit life insurance policy and/or imposed on the requested additional death benefit based on the insured-provided fields in the second, third, and fourth functions;

the user interface calculates and displays via graphics, tables, the formula field or the data relationship components, the projected premium each year, segmented between the underwriting class and death benefit provided for an existing dynamic death benefit life insurance policy and new death benefit being requested, based on the insured's adjustments to the second, third, and/or fourth functions in the formula fields, the tables or the data relationship components, needed to estimate the premium rate per unit for all types of dynamic life insurance benefits projected in the future, and the system may forecast the current premium rates based on an approved underwriting class for the existing death benefit and estimated underwriting class based on user input in the fourth function prior to formal application submission;

a dynamic life insurance death benefits management component comprising:

one or more processors; and one or more non-transitory computer-readable media storing computing instructions that, when executed on the one or more processors, perform the functions of:

identifying a category of dynamic death benefit based on a life insurance need of the insured;

determining qualifying data to calculate a dynamic death benefit of the life insurance policy based on a category of insurance coverage;

determining a frequency and timing of a data refresh based on the category of the dynamic death benefit and contractual requirements being serviced for the insured's life insurance policy;

retrieving data specific to the category of insurance on the insured to recompute a death benefit;

retrieving rules and limitations on changes to the life insurance policy's recomputed death benefit specific to the category of coverage and that policy's particular circumstances;

determining a life insurance policy's revised death benefit based on at least a product of (i) an earned income value for the insured and (ii) the third function for determining the change in policy benefits based on the income reported for the insured;

applying, based on the category of dynamic life insurance benefit, any applicable limitations or restrictions on the change in benefits for the current reset period, incorporating different limitation formulas that may apply to dynamic death benefit life insurance policies combining two or more death benefit s purchased at different times;

wherein, for all types of dynamic life insurance benefits, the death benefit amount changes automatically and without new underwriting, thereby reducing an amount of processing required by computing systems that require underwriting and reducing storage requirements, and eliminating risk to the insured that new underwriting might result in rejection of the additional insurance; and servicing the life insurance policy with a death benefit that is dynamically redetermined periodically based on independent data unique to the category of insurance coverage and specific to the insured changing dynamically as represented by the independent data;

subsequent to the dynamic death benefit life insurance policy being issued, the system executes at least one of the following:

transmit a notification to the insured to access the insured's life insurance policy account, in response to the benefit amount being updated, and, in response to the insured accessing the life insurance policy account, displaying, via the formula field or the data relationship component of the user interface, the insured's updated benefit amount and new premium required;

enable the insured to make voluntary changes to the insured's benefit amount based on the insured adjusting the third function formula field, the variable tables, the user input, or the data relationship component, the third function determining a reduction in the policy death benefit, in response to which the system recomputes the current premium required based on the revised benefit amount, underwriting class, insured's current age, and/or which death benefit is being reduced if the policy contains death benefit purchased and underwritten at multiple times;

in response to the insured engaging with the user interface to adjust the fifth function in the formula field or the data relationship component to request an increase in additional death benefit, the system will engage an underwriting process for the requested increase in death benefit, recompute the current premium, incorporate any updates to the second, third and fourth function variables, formulas, or tables to define the current and future additional death benefit in relation to the future earned income, and display the changes to the insured graphically, via the tables and/or the formulas or the data relationship component, showing the requested combined dynamic death benefit life insurance policy and the existing dynamic death benefit life insurance policy death benefit information separate from the requested increase in death benefit;

wherein, the first function, second function, third function, fourth function, and/or fifth function of the user interface enable the insured to simulate and evaluate, in real-time different possible combinations of initial insurance death benefit and future changes to benefits and view, in real-time, information from the management component corresponding to such simulated combinations, including information about the projected cost, future benefits, and/or death benefit limitations; and in response to receiving an indication that the insured has completed all inputs and changes to the dynamic death benefit life insurance policy through the user interface, the system submits a formal application for the dynamic death benefit life insurance policy to a third-party system associated with an insurance carrier.

2. The system of claim 1, wherein the independent data specific to the insured comprises at least one of: data representing an annual earned income, data representing a value of a tax-qualified individual retirement account.

3. The system of claim 1, wherein the category for the dynamic death benefit comprises at least one of: a benefit of the insured's earned income, a benefit of the insured's retirement account.

4. The system of claim 3, wherein determining the category comprises identifying a death benefit category provided by the insured.

5. The system of claim 1, wherein the qualifying data comprises information from the insured's income tax filing, or the insured's retirement account statement.

6. The system of claim 1, wherein:

the frequency of the qualifying data refresh comprises annually refreshing the qualifying data; and the timing of the qualifying data refresh comprises a time period corresponding to an annual tax filing, or periodic account statement for a retirement account.

7. The system of claim 1, wherein retrieving the data specific to the category of insurance on the insured seeking life insurance coverage to recompute a death benefit, further comprises retrieving income data from at least one of a tax filing or W2 form, or retirement account statement.

8. The system of claim 1, wherein the rules and limitations comprise: functions and metrics corresponding to an income multiple and a calibrating variable.

9. The system of claim 1, wherein servicing the life insurance policy further comprises calculating a new premium for each policy based on the insured's underwriting class and new benefit amount.

10. The system of claim 1, wherein the insured is at least one of: a policy owner, or an individual insured by the policy owner.

11. A system for administering a dynamic death benefit life insurance policy wherein the death benefit changes periodically and automatically without new underwriting based on data corresponding to an insured's life insurance needs, comprising:
- a user interface including a plurality of adjustable functions that facilitate forecasting the insured's life insurance needs and determining the changes in future benefits provided by the dynamic death benefit life insurance policy, and enable the insured to view and evaluate a variety of possible combinations of current and future death benefits and insurance costs prior to formally applying for the dynamic death benefit life insurance policy;
- the user interface displaying a plurality of functions of a formula field or a data relationship component to the insured in purchasing dynamic life insurance, wherein the formula field or data relationship component includes one or more of a variable chart and variable table, the plurality of functions including:
- a first function corresponding to correlating the dynamic death benefit life insurance policy to the insured's retirement account in an individual policy independent of any particular retirement account provider while including all retirement accounts the insured selected to protect;
- a second function corresponding to projecting the insured's future retirement account balance, wherein the second function includes, via the formula field, data relationship component, variable table, one or more user input fields, or a combination thereof, receiving the insured's current retirement account balance and projecting the insured's future retirement account balance by dynamic death benefit life insurance policy duration since issue, insured's age, or other criteria;
- a third function corresponding to determining the requested dynamic death benefit life insurance policy's initial face amount of death benefit being applied for and future increases in benefits, wherein the third function includes, via the formula field, data relationship component, variable table, and/or the user input fields, or a combination thereof, determining the dynamic death benefit life insurance policy benefit changes relative to the future retirement account balance;
- a fourth function corresponding to determining an estimate of the proposed insured's current health status for the dynamic death benefit life insurance policy prior to the insurance company underwriting a formal application, the health status corresponding to an expected underwriting class, wherein the fourth function includes displaying risk input fields for age, gender, smoker status, and general health assessment fields with computer-assisted definitions to assist the insured in estimating an underwriting class; and
- a fifth function corresponding to the insured specifying if the requested dynamic death benefit life insurance policy is a stand-alone dynamic death benefit life insurance policy or additional death benefit to be added to an existing dynamic death benefit life insurance policy, with existing dynamic death benefit life insurance policy fields to input existing contract information if applicable, upon which the user interface system transmits a request tothe administrative system to obtain information on the existing dynamic death benefit life insurance policy such as current death benefit amount, underwriting class, limitations on death benefit increase without additional underwriting, and the third function formulas, variable tables, data relationship components and other factors that determine available death benefit increases without underwriting on previously approved death benefit;
- in response to: (i) the insured selecting the retirement account linked death benefit in the first function, and (ii) the insured adjusting the second function via the formula fields or the data relationship component, the user interface utilizes the adjustments to the second function to calculate and display via the tables, the graphs, and the related formula fields, user input or data relationship components, the current and the future retirement account balance projected by the user interface;
- in response to: (i) the insured selecting the retirement account linked death benefit in the first function, and (ii) the insured adjusting the second, third and fourth functions via the formula fields or the data relationship component, and the fifth function indicating a new stand-alone dynamic death benefit life insurance policy is being requested, the user interface utilizes the adjustments to the second, third and fourth functions to calculate and display via tables, graphs, and related formula fields, user input or data relationship components the initial and future life insurance benefits needed based, at least in part, on assumptions provided by the insured, and the insurance benefits to be provided by the dynamic death benefit life insurance policy relative to any adjustment limitations imposed by the existing dynamic death benefit life insurance policy and expected to be imposed by the dynamic death benefit life insurance policy based on the insured-provided fields in the second, third, and fourth functions;
- in response to: (i) the insured selecting the retirement account linked death benefit in the first function, and (ii) the insured adjusting the second, third and fourth functions via the formula fields or the data relationship component, and the fifth function indicating the death benefit requested is additional death benefit on an existing dynamic death benefit life insurance policy, the user interface utilizes the adjustments to the second, third and fourth functions to calculate and display via tables, graphs, and related formula fields, user input or data relationship components the initial and future life insurance benefits, and the insurance benefits to be provided by the dynamic death benefit life insurance policy relative to any adjustment limitations imposed by the existing dynamic death benefit life insurance policy and/or imposed on the requested additional death benefit based on the insured-provided fields in the second, third, and fourth functions;
- the user interface calculates and displays via graphics, tables, the formula field or the data relationship components, the projected premium each year, segmented between the underwriting class and death benefit provided for an existing dynamic death benefit life insurance policy and new death benefit being requested, based on the insured's adjustments to the second, third, and/or fourth functions in the formula fields, the tables or the data relationship components, needed to estimate the premium rate per unit for all types of dynamic life insurance benefits projected in the future, and the system may forecast the current premium rates based on an approved underwriting class for the existing death benefit and estimated underwriting class based on user input in the fourth function prior to formal application submission;

a dynamic life insurance death benefits management component comprising: one or more processors; and one or more non-transitory computer-readable media storing computing instructions that, when executed on the one or more processors, perform the functions of:

identifying a category of dynamic death benefit based on a life insurance need of the insured;

determining qualifying data to calculate a dynamic death benefit of the life insurance policy based on a category of insurance coverage;

determining a frequency and timing of a data refresh based on the category of the dynamic death benefit and contractual requirements being serviced for the insured's dynamic death benefit life insurance policy;

retrieving data specific to the category of insurance on the insured to recompute a death benefit;

retrieving rules and limitations on changes to the life insurance policy's recomputed death benefit specific to the category of coverage and that policy's particular circumstances;

determining a life insurance policy's revised death benefit based on at least a product of (i) a retirement account value for the insured and (ii) the third function for determining the change in policy benefits based a fixed percentage for that insured's dynamic death benefit policy;

applying, based on the category of dynamic life insurance benefit any applicable limitations or restrictions on the change in benefits for the current reset period, incorporating different limitation formulas that may apply to dynamic death benefit life insurance policies combining two or more death benefits purchased at different times;

wherein, for all types of dynamic life insurance benefits, the death benefit amount changes automatically and without new underwriting, thereby reducing an amount of processing required by computing systems that require underwriting and reducing storage requirements, and eliminating risk to the insured individual that new underwriting might result in rejection of the additional insurance; and servicing the life insurance policy with a death benefit that is dynamically redetermined periodically based on independent data unique to the category of insurance coverage and specific to the insured changing dynamically as represented by the independent data;

subsequent to the dynamic death benefit life insurance policy being issued, the system executes one of the following:

transmit a notification to the insured to access the insured's life insurance policy account, in response to the benefit amount being updated, and, in response to the insured accessing the life insurance policy account, displaying, via the formula field or the data relationship component of the user interface, the insured's updated benefit amount and new premium required;

enable the insured to make voluntary changes to the insured's benefit amount based on the insured adjusting the third function formula field, the variable tables, the user input, or the data relationship component, the third function determining a reduction in the policy death benefit, in response to which the system recomputes the current premium required-based on the revised benefit amount, underwriting class, insured's current age, and/or which death benefit is being reduced if the policy contains death benefit purchased and underwritten at multiple times;

in response to the insured engaging with the user interface to adjust the fifth function in the formula field or the data relationship component to request an increase in additional death benefit, the system will engage an underwriting process for the requested increase in death benefit, recompute the current premium, incorporate any updates to the second, third and fourth function variables, formulas, or tables to define the current and future additional death benefit in relation to the future retirement account balance, and display the changes to the insured graphically, via the tables and/or the formulas or the data relationship component, showing the requested combined dynamic death benefit life insurance policy and the existing dynamic death benefit life insurance policy death benefit information separate from the requested increase in death benefit;

wherein, the first function, second function, third function, fourth function, and/or fifth function of the user interface enable the insured to simulate and evaluate, in real-time different possible combinations of initial insurance death benefit and future changes to benefits and view, in real-time, information from the management component corresponding to such simulated combinations, including information about the projected cost, future benefits, and/or death benefit limitations; and in response to receiving an indication that the insured has completed all inputs and changes to the dynamic death benefit life insurance policy through the user interface, the system submits a formal application for the dynamic death benefit life insurance policy to a third-party system associated with an insurance carrier.

12. The system of claim 11, wherein the insured is at least one of: a policy owner, or an individual insured by the policy owner.

* * * * *